(12) United States Patent
Roell

(10) Patent No.: US 9,879,812 B2
(45) Date of Patent: Jan. 30, 2018

(54) VALVE ACCESS CONDUIT ASSEMBLY AND METHOD OF INSTALLING THE ASSEMBLY

(71) Applicant: Argonics, Inc., Gwinn, MI (US)

(72) Inventor: Joseph Roell, Gwinn, MI (US)

(73) Assignee: Argonics, Inc., Gwinn, MI (US)

( * ) Notice: Subject to any disclaimer, the term of this patent is extended or adjusted under 35 U.S.C. 154(b) by 0 days.

(21) Appl. No.: 15/056,770

(22) Filed: Feb. 29, 2016

(65) Prior Publication Data

US 2016/0252187 A1  Sep. 1, 2016

Related U.S. Application Data

(63) Continuation-in-part of application No. 13/999,278, filed on Feb. 5, 2014.

(60) Provisional application No. 62/121,707, filed on Feb. 27, 2015.

(51) Int. Cl.

| F16L 5/00 | (2006.01) |
|---|---|
| F16L 55/07 | (2006.01) |
| F16K 31/46 | (2006.01) |

(52) U.S. Cl.
CPC ............. *F16L 55/07* (2013.01); *F16K 31/46* (2013.01); *Y10T 29/49407* (2015.01); *Y10T 137/0491* (2015.04); *Y10T 137/598* (2015.04); *Y10T 137/6991* (2015.04)

(58) Field of Classification Search
CPC . Y10T 137/7017; E03B 9/10; E02D 29/1409; F16L 27/12; F16L 55/07; B65D 21/086

USPC .......................... 137/363, 364, 366, 369, 370
See application file for complete search history.

(56) References Cited

U.S. PATENT DOCUMENTS

| 604,622 | A | * | 5/1898 | Lobdell et al. | ........... E03B 7/04 137/365 |
|---|---|---|---|---|---|
| 613,652 | A | * | 11/1898 | Chadbourne | ............. E03B 9/10 137/365 |
| 891,207 | A | * | 6/1908 | Connolly | ................ F16K 31/46 137/369 |
| 1,004,436 | A | * | 9/1911 | Kehr, Sr. | .................... E03B 9/10 137/366 |
| 1,484,699 | A | * | 2/1924 | Beagle | ...................... E03B 9/10 137/366 |
| 1,501,511 | A | * | 7/1924 | Beagle | ...................... E03B 9/10 137/366 |
| 1,578,885 | A | * | 3/1926 | Flinn | ........................ E03B 9/10 137/366 |
| 2,691,384 | A | * | 10/1954 | Mueller | .................... E03B 9/10 137/366 |

(Continued)

*Primary Examiner* — Reinaldo Sanchez-Medina
(74) *Attorney, Agent, or Firm* — Wood, Phillips, Katz, Clark & Mortimer

(57) ABSTRACT

The combination of: an underground valve for a supply line and having an underground actuator through which a state of the valve can be changed to control flow within the supply line; and a conduit assembly embedded in ground material and defining an access passage through which above ground access can be obtained to the valve actuator. The conduit assembly has a housing defining a cavity in which at least a portion of the valve resides. The conduit assembly further has a valve base assembly configured to interact with: a) the housing; and b) at least one of: i) the valve; and ii) the supply line to maintain a desired relationship between the housing and the at least one of: i) the valve; and ii) the supply line.

23 Claims, 31 Drawing Sheets

(56) References Cited

U.S. PATENT DOCUMENTS

| | | | | |
|---|---|---|---|---|
| 3,658,086 | A * | 4/1972 | Hart | F16K 27/006 |
| | | | | 137/368 |
| 4,036,249 | A * | 7/1977 | Perry, Sr. | E03F 1/002 |
| | | | | 137/367 |
| 4,310,015 | A * | 1/1982 | Stewart | F16K 27/006 |
| | | | | 137/315.01 |
| 4,691,733 | A * | 9/1987 | Zinn | F16K 35/10 |
| | | | | 137/364 |
| 5,327,925 | A * | 7/1994 | Ortel | E03B 9/10 |
| | | | | 137/15.08 |
| 5,555,998 | A * | 9/1996 | Coppola | E03B 9/10 |
| | | | | 137/371 |
| 7,117,883 | B1 * | 10/2006 | Vitalo | E03B 9/08 |
| | | | | 137/366 |
| 8,082,945 | B1 * | 12/2011 | White | F16K 27/006 |
| | | | | 137/369 |
| 8,136,744 | B2 * | 3/2012 | Gerard | A62C 31/28 |
| | | | | 239/159 |
| 2008/0023077 | A1 * | 1/2008 | Weisz | B25B 13/48 |
| | | | | 137/370 |

* cited by examiner

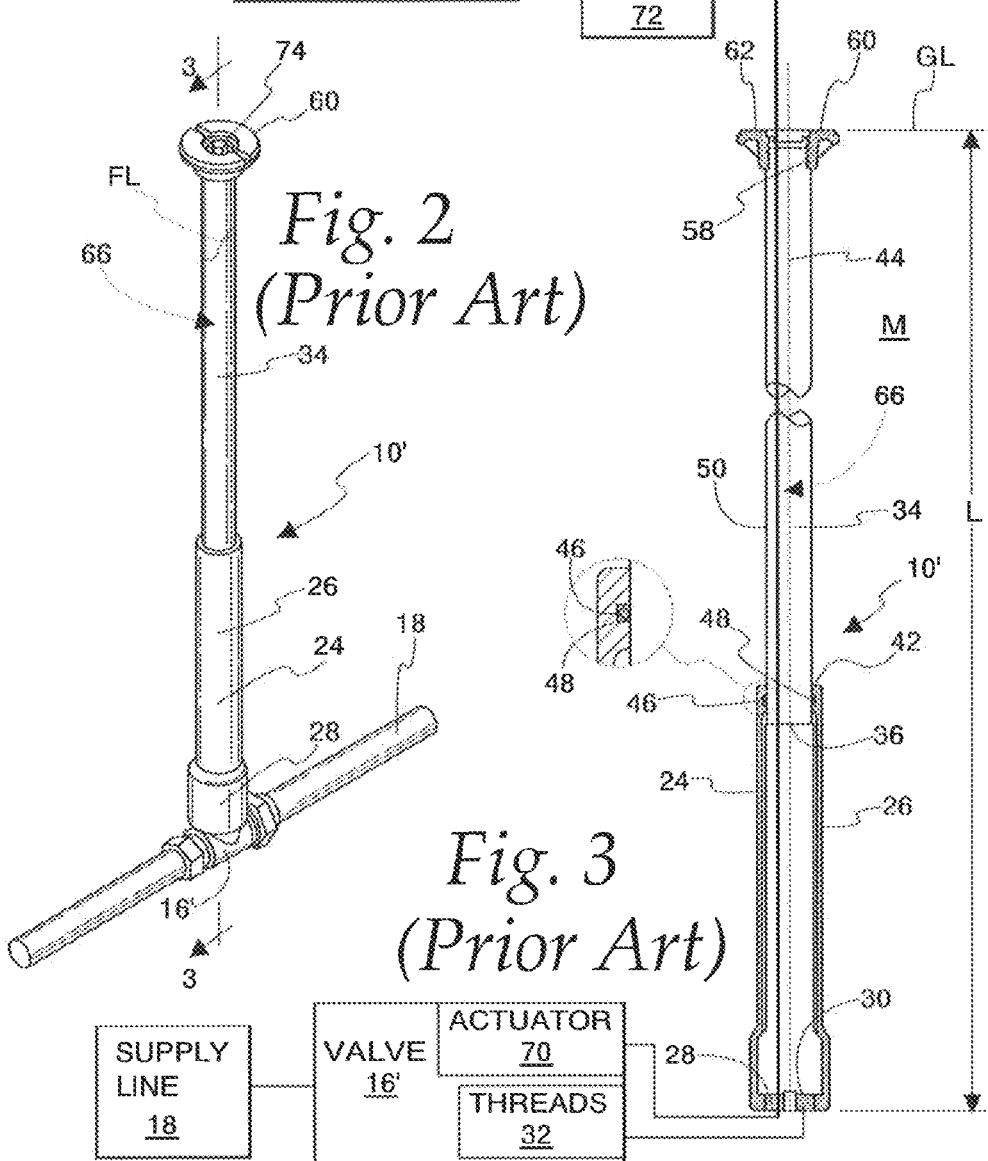

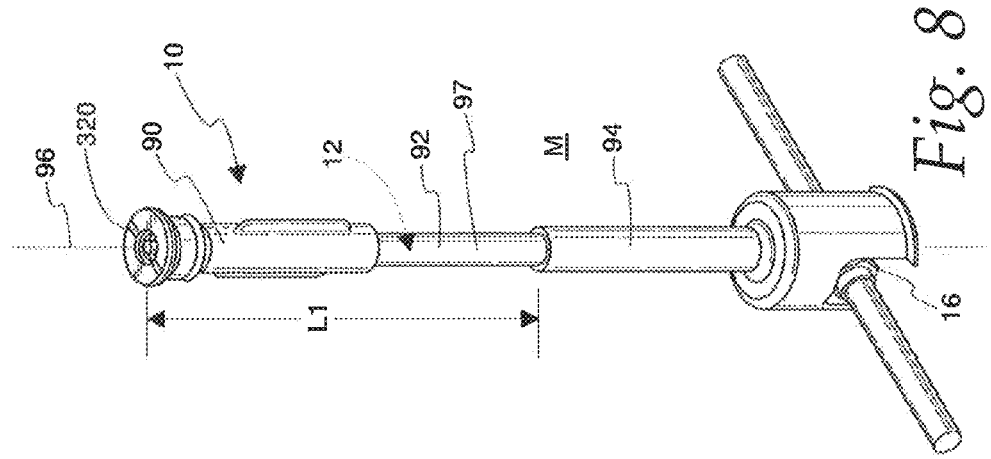
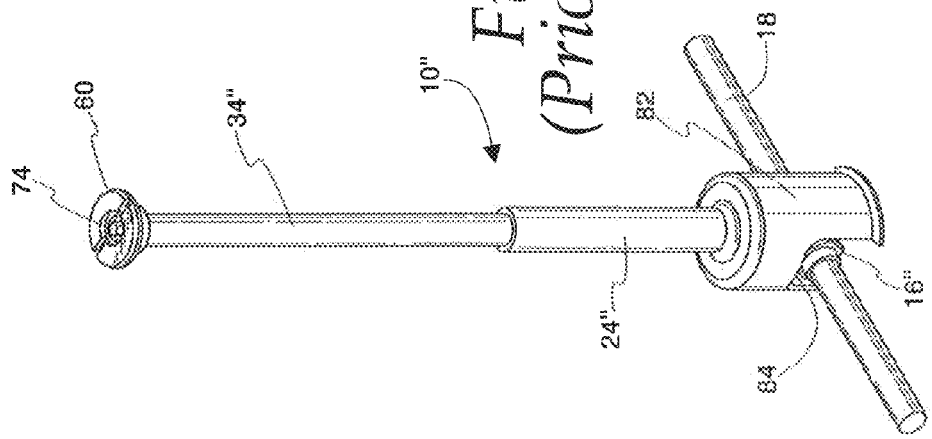

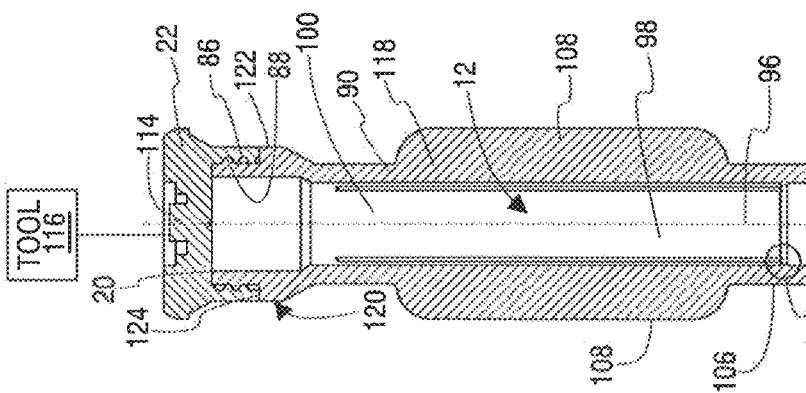
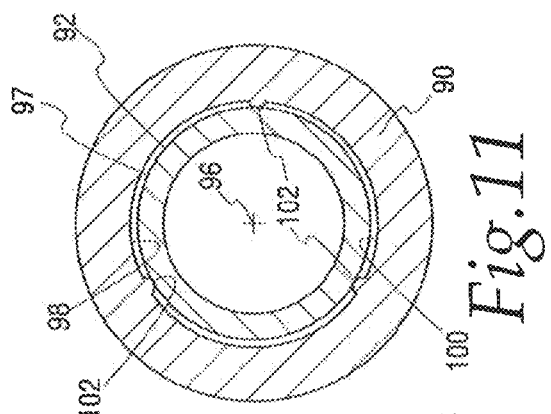
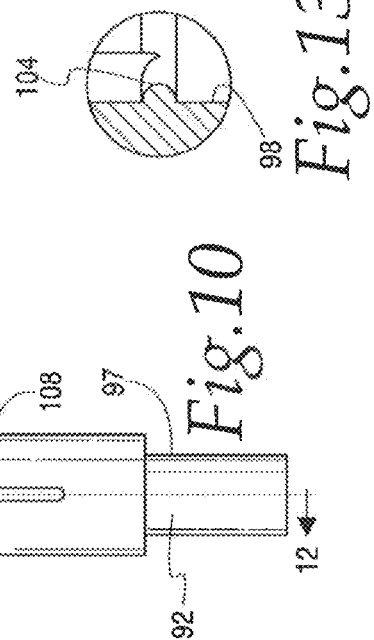
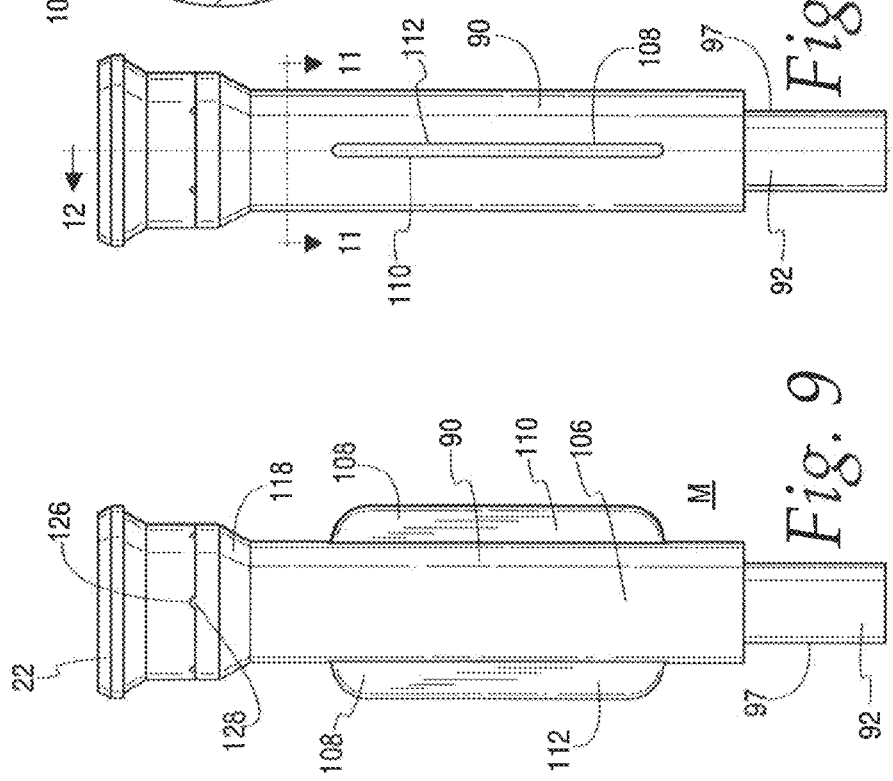
Fig. 12
Fig. 11
Fig. 13
Fig. 10
Fig. 9

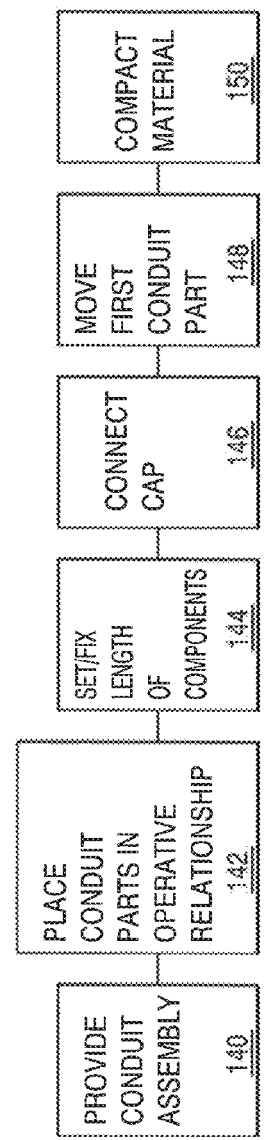
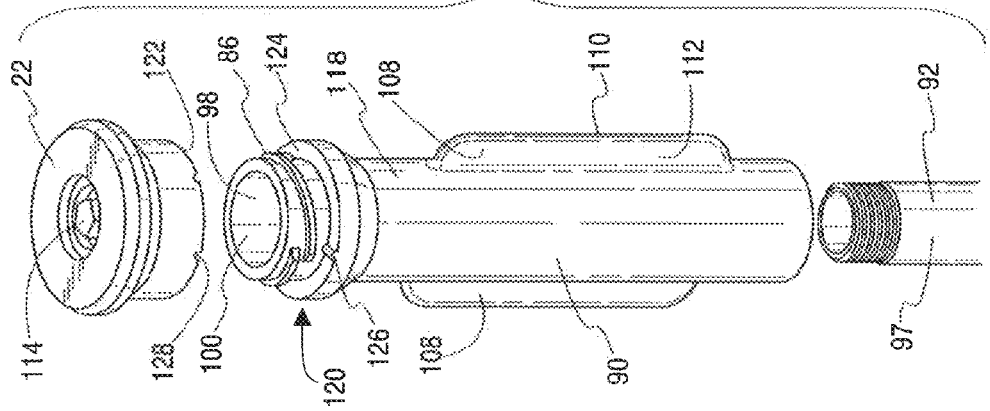

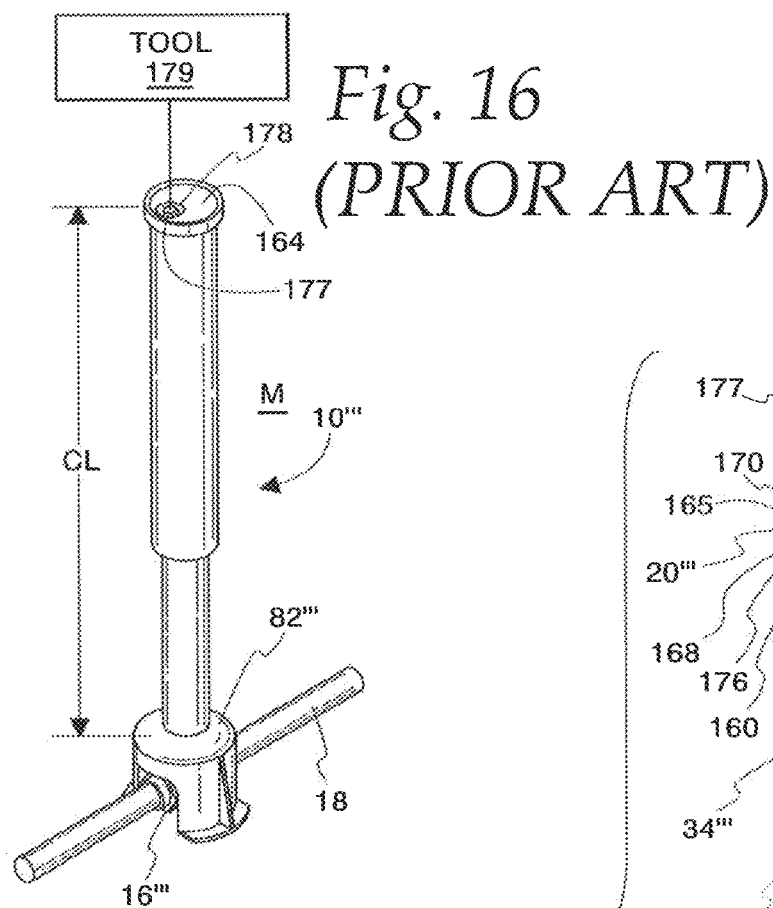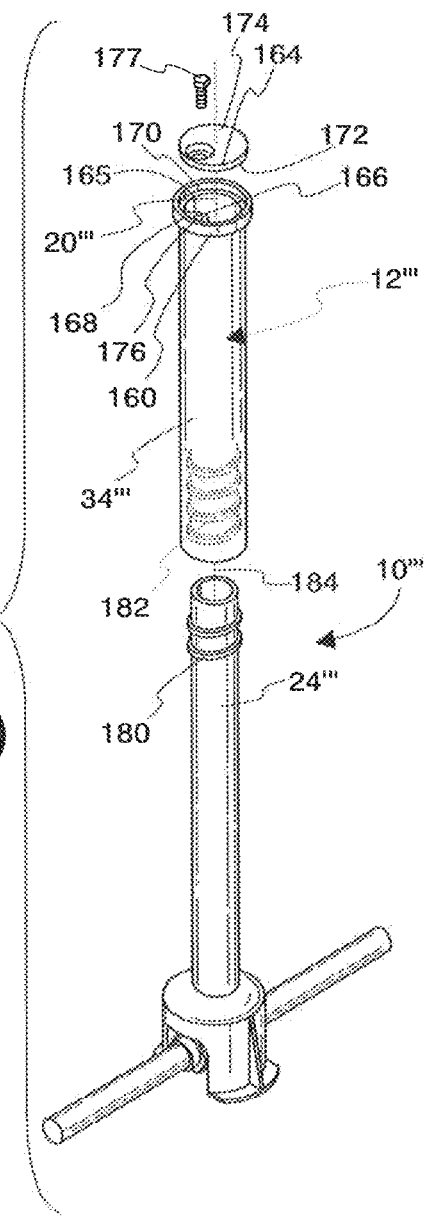

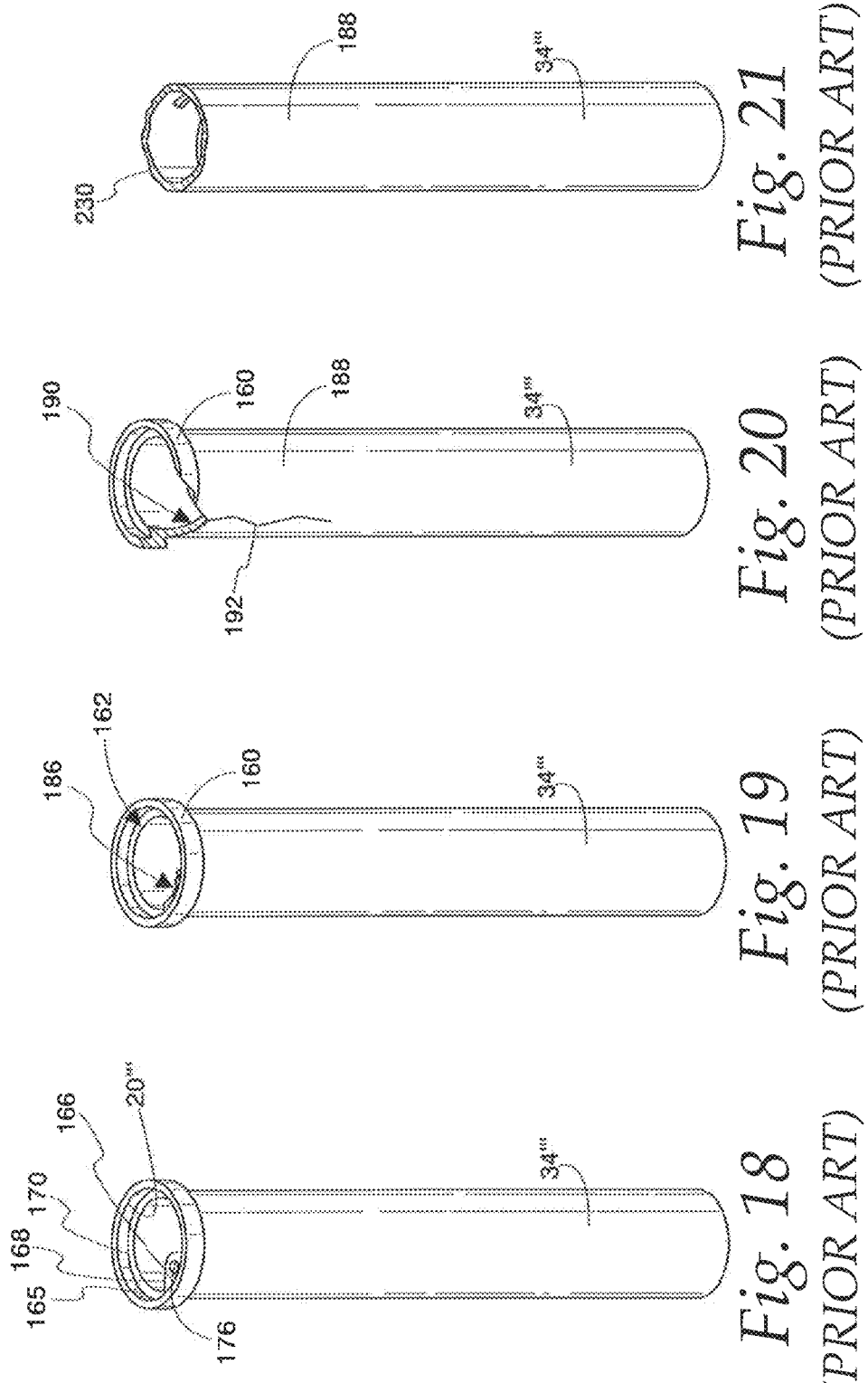

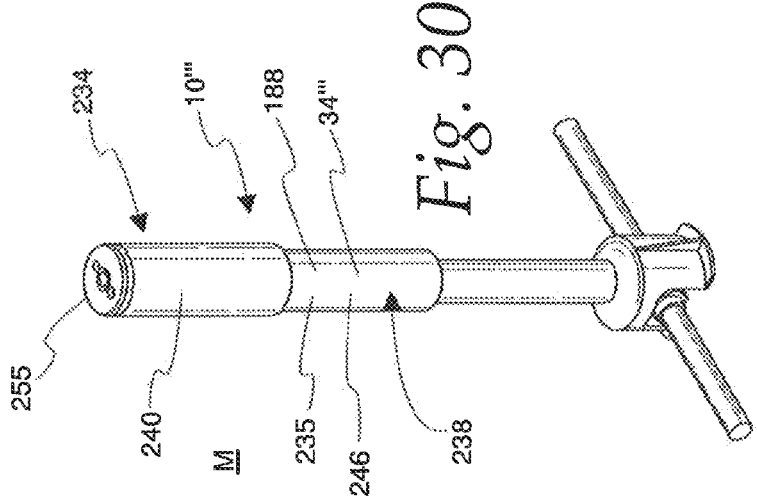
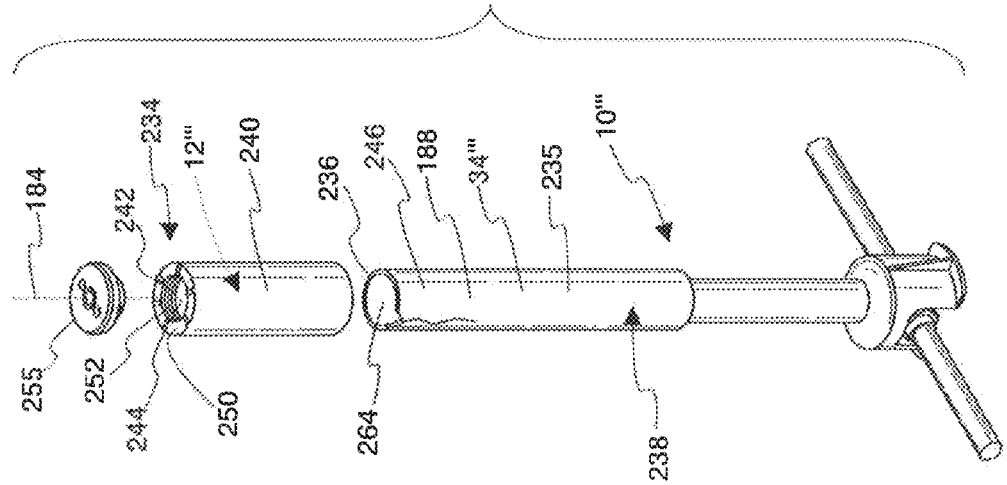

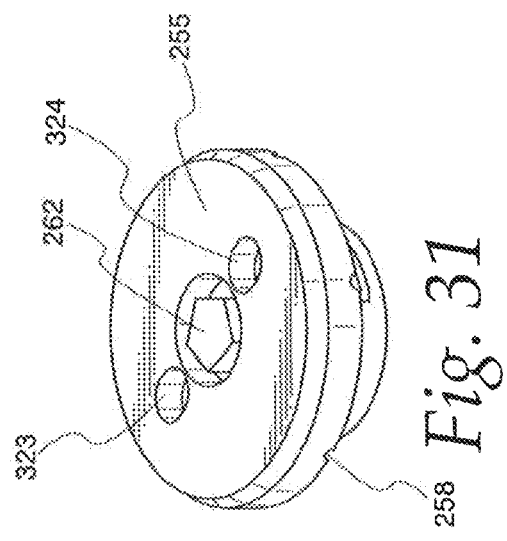
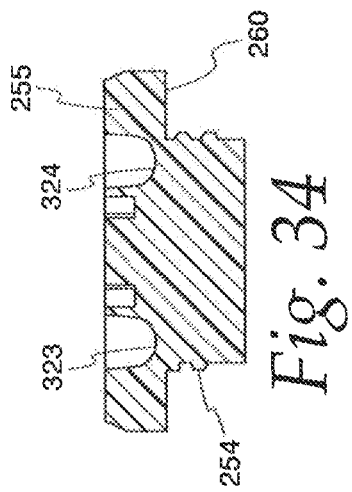
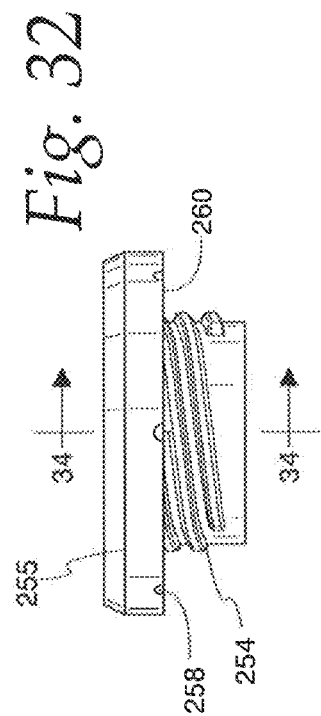
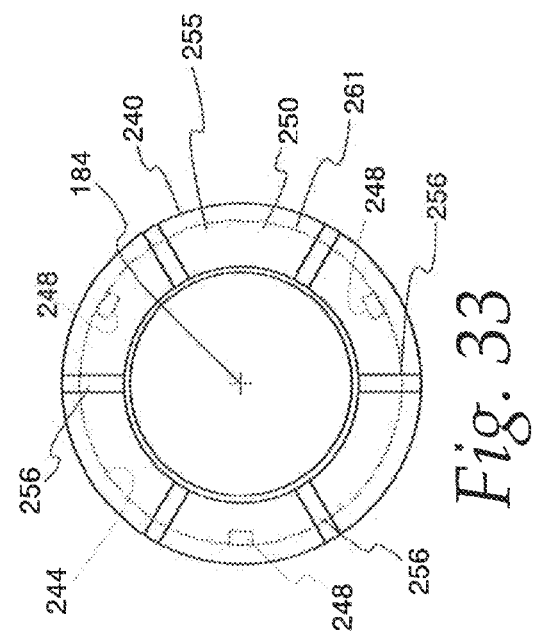

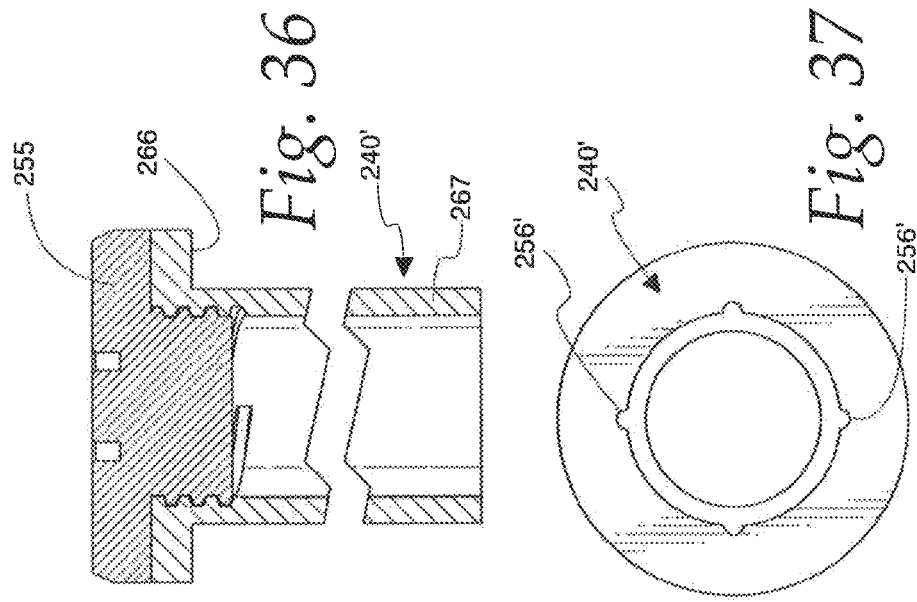
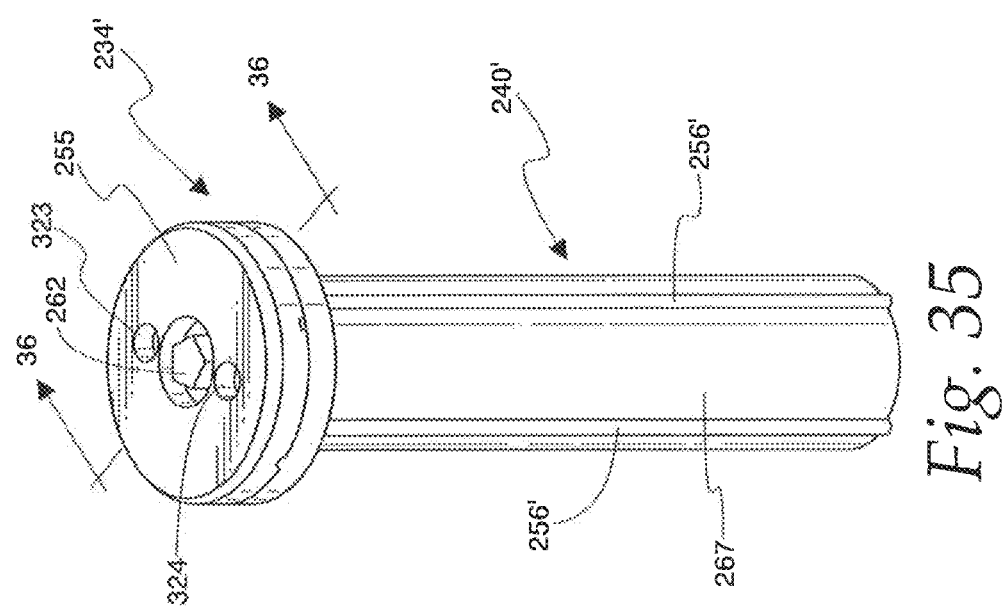

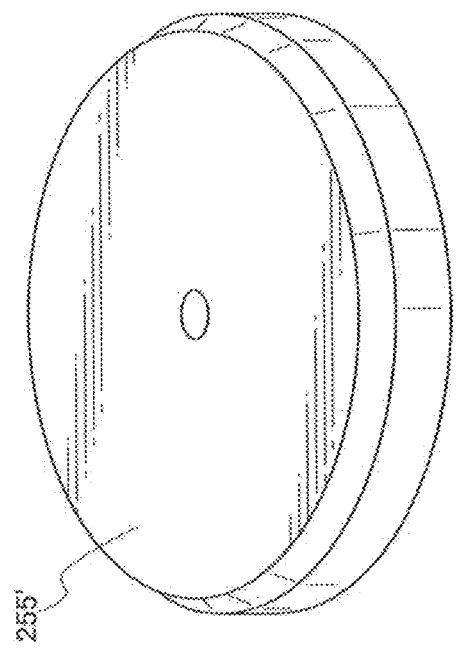
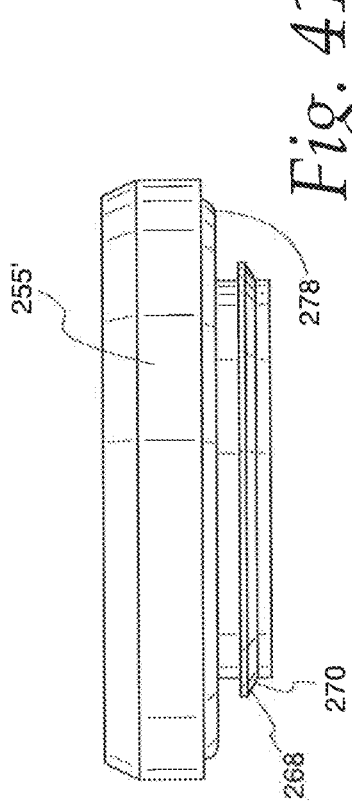
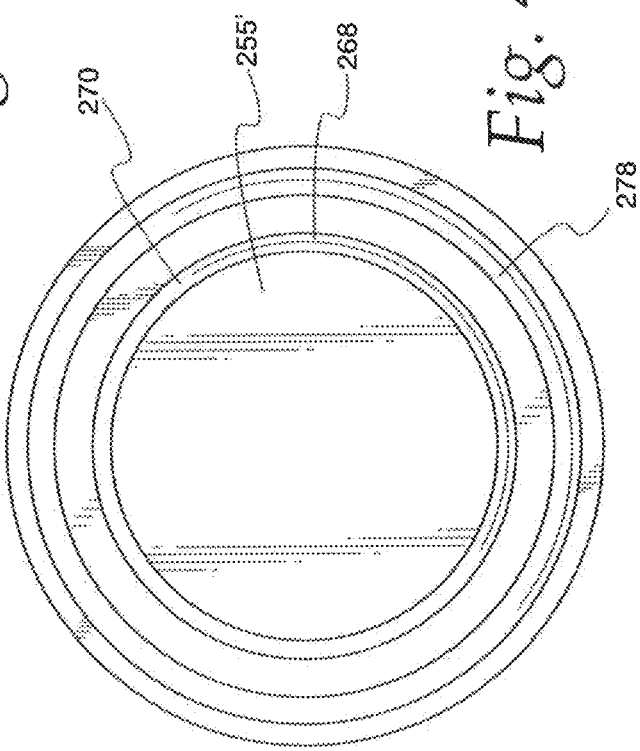

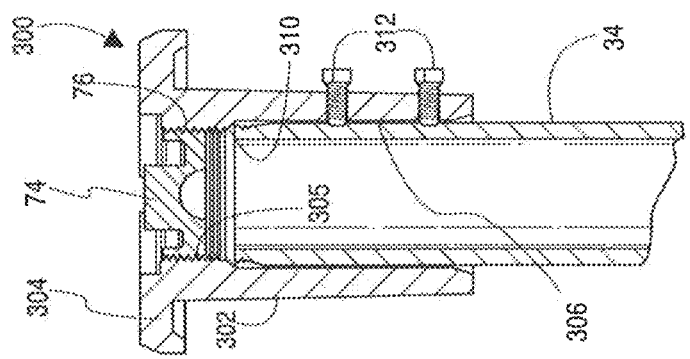
Fig. 46
(PRIOR ART)
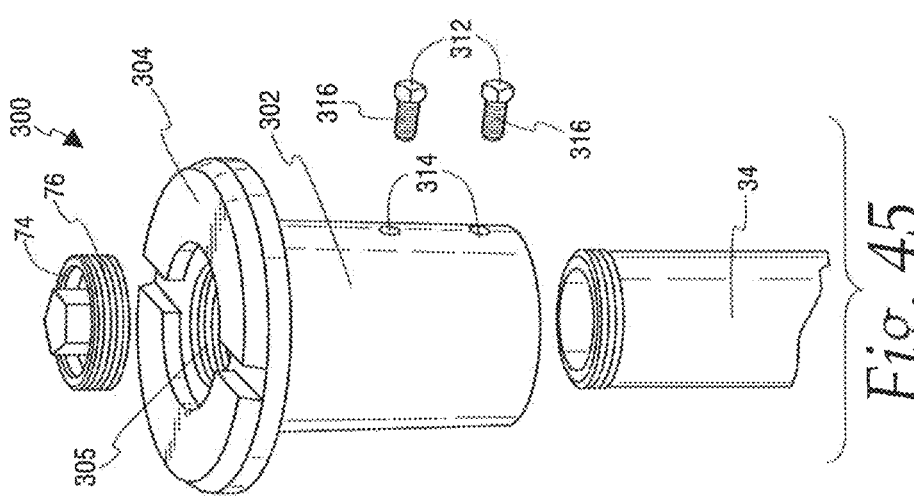
Fig. 45
(PRIOR ART)
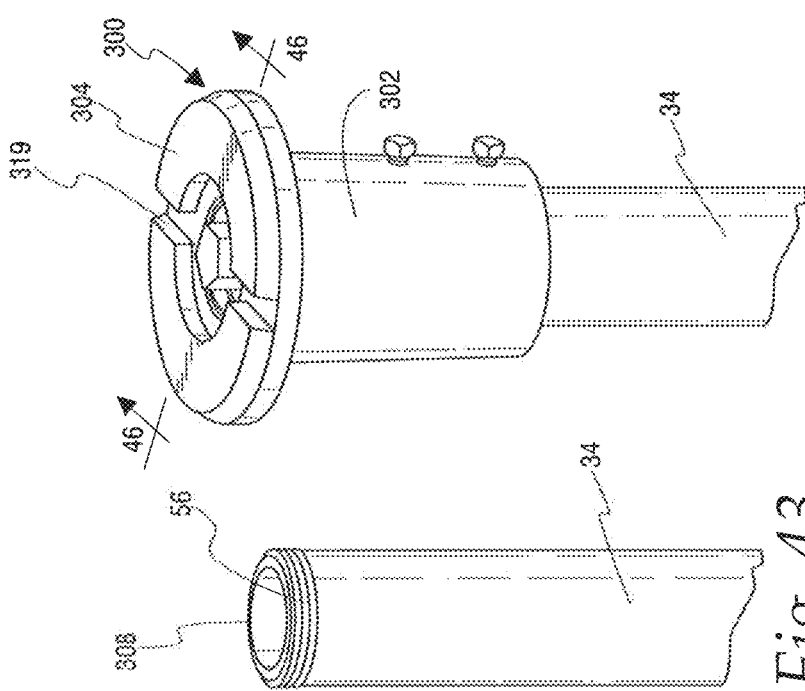
Fig. 44
(PRIOR ART)
Fig. 43
(PRIOR ART)

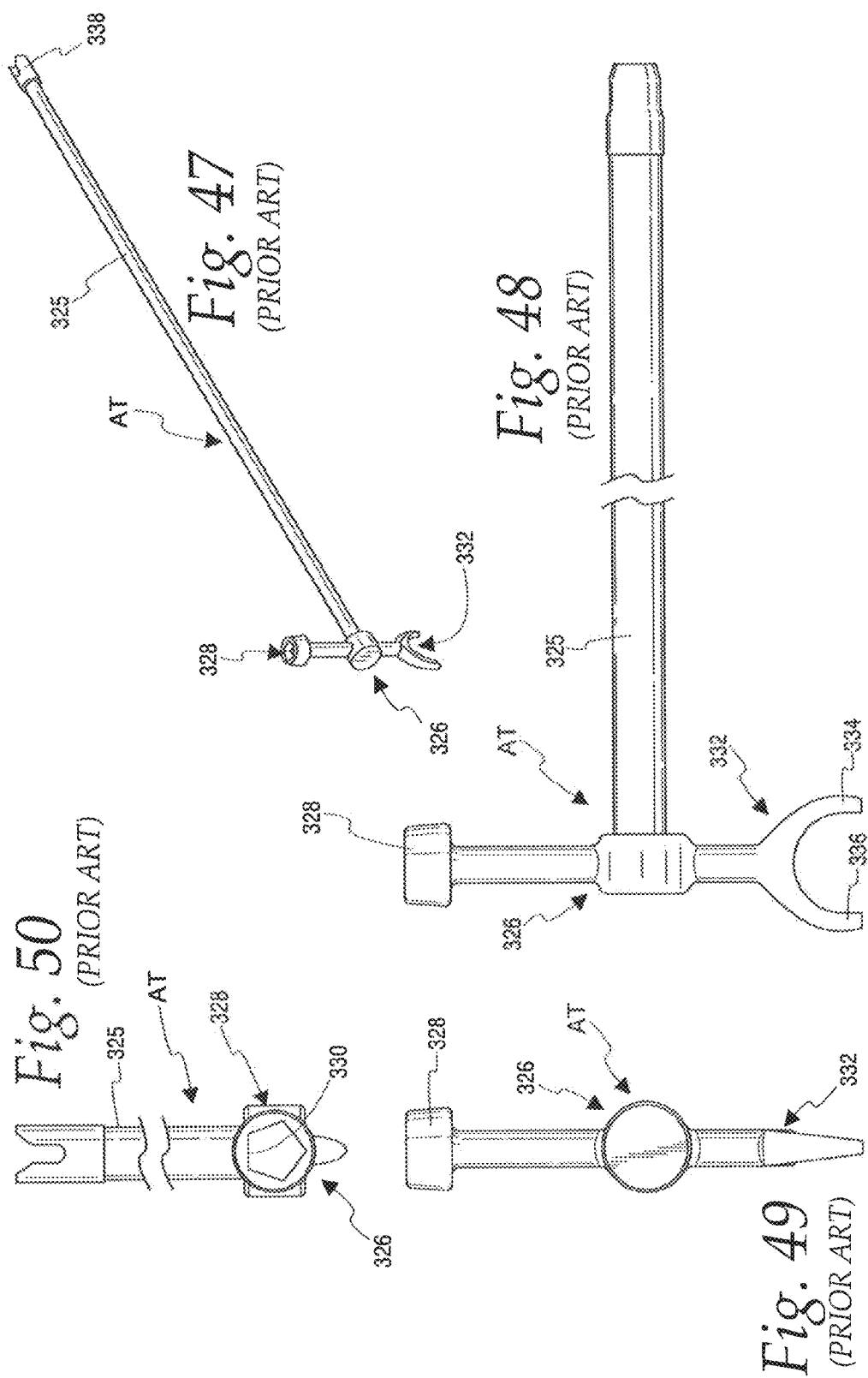

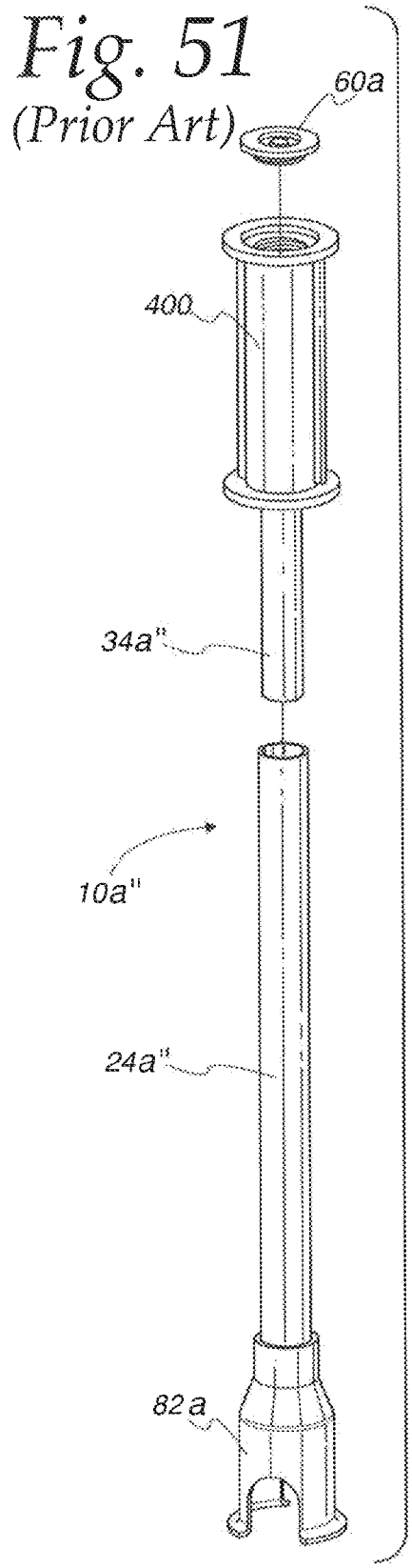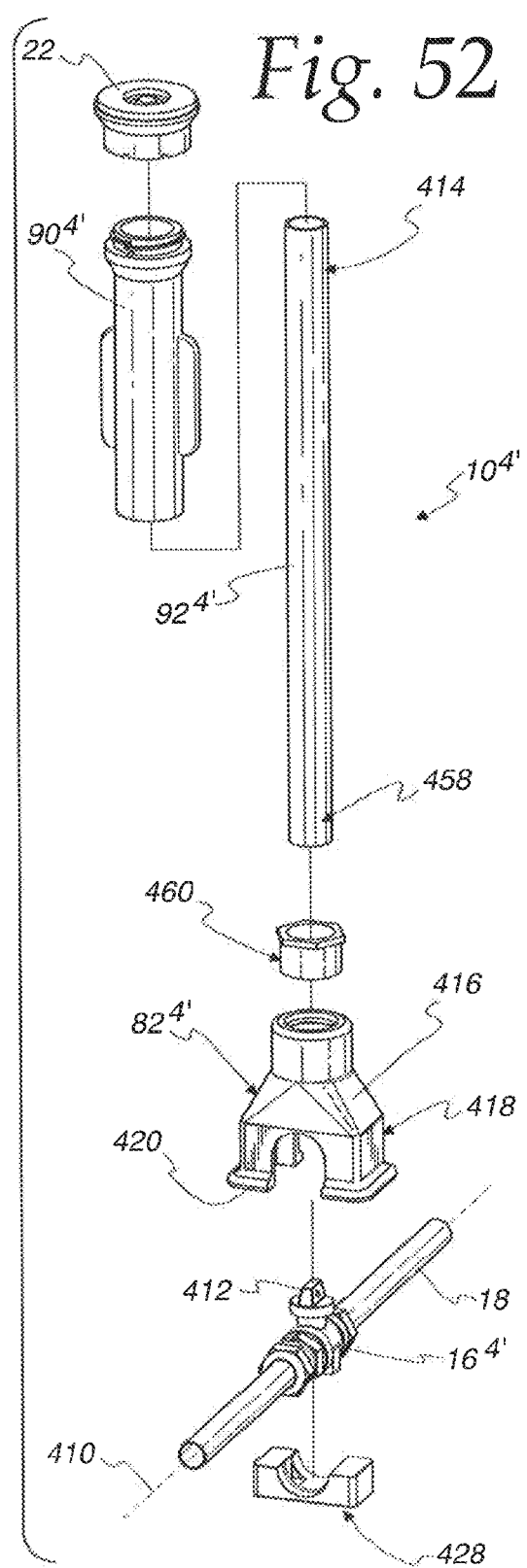

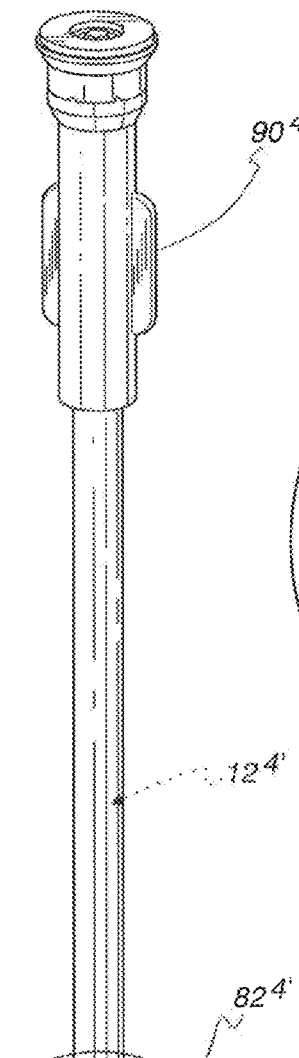
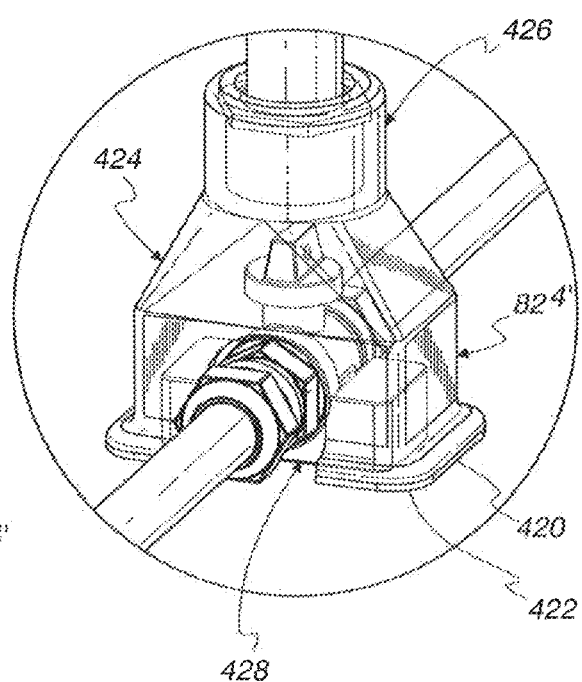
Fig. 53a
Fig. 53b

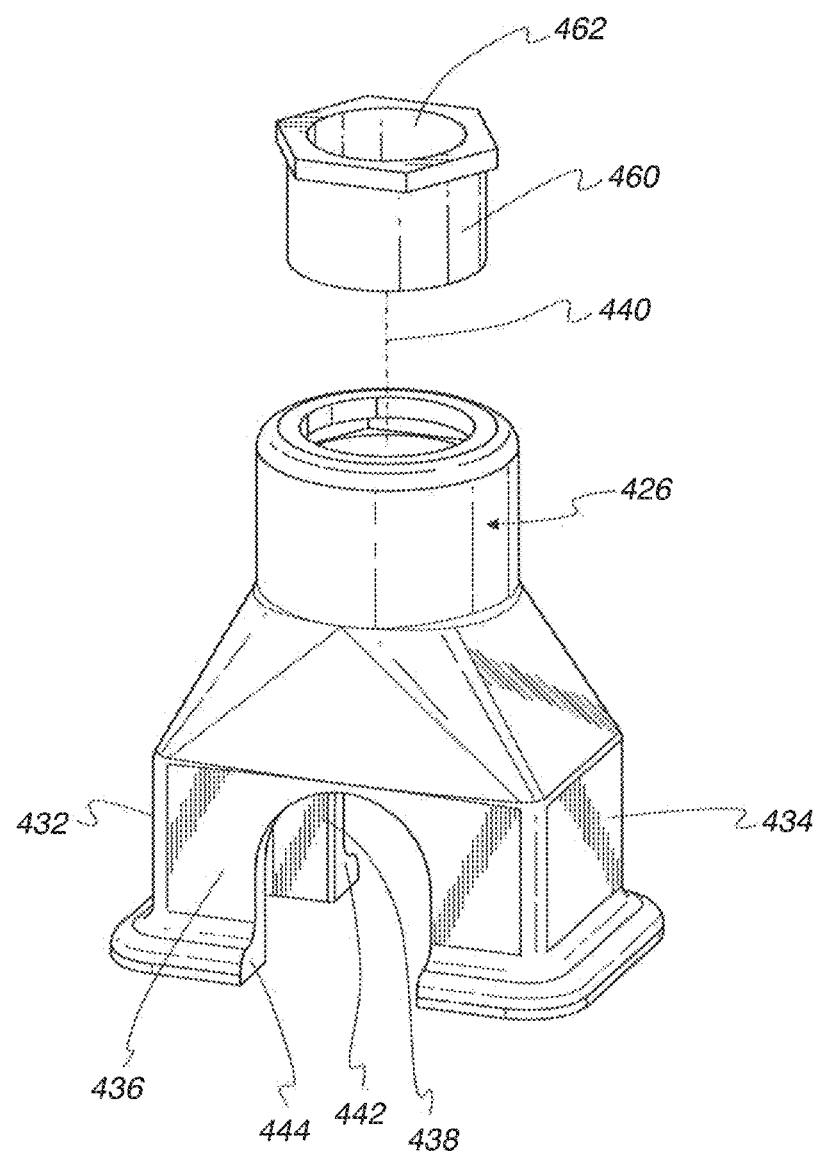

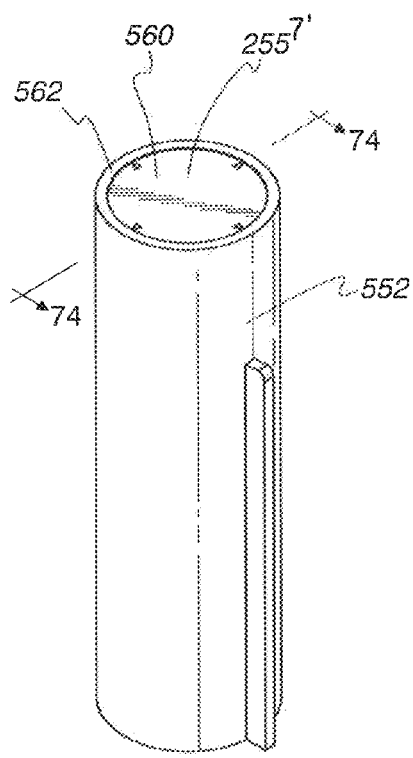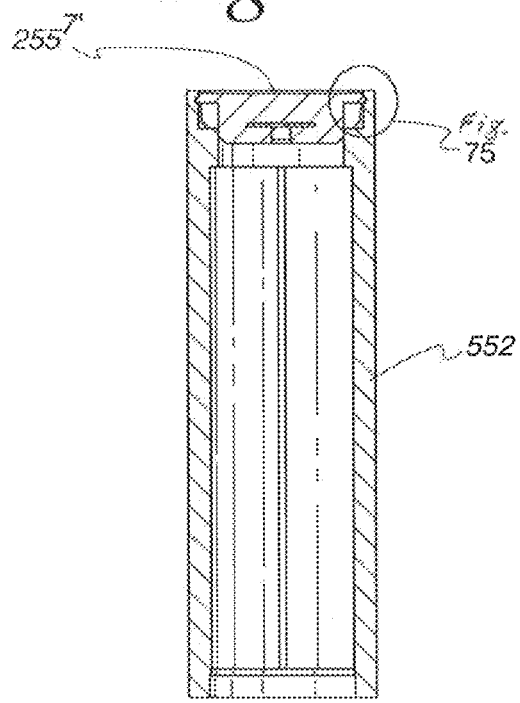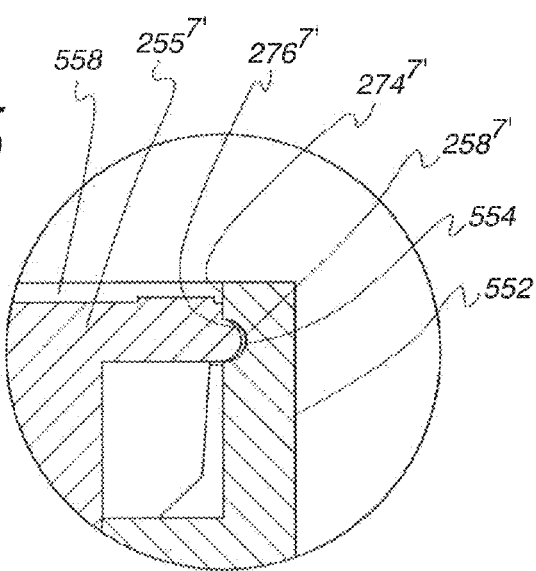

VALVE ACCESS CONDUIT ASSEMBLY AND
METHOD OF INSTALLING THE ASSEMBLY

BACKGROUND OF THE INVENTION

Field of the Invention

This invention relates to underground valves, such as utility valves and, more particularly, to a conduit assembly through which above ground access can be gained to a valve.

Background Art

Underground valves are used to selectively control utility supply, such as water, to individual residences and businesses. Each valve is typically situated several feet underground and is accessed through a vertical conduit assembly. In one known form, the upper end of the conduit assembly is closed by a cap with a separable plug that is threaded into place. The plug is separated to produce an entry opening to a passage extending downwardly to the valve. The plug is provided with a fitting to be engaged by a special tool, which thereby allows a level of control of access to the valve.

Existing conduit assemblies take a number of different forms. In one form, a cast housing, with an inverted cup shape, is placed over the valve and straddles the supply line and valve. The housing continues upwardly into a conduit, with a length selected so that the cap on the conduit is flush with grade.

In an alternative design, a conduit assembly has a fitting that is threaded directly to the underground valve. The conduit assembly defines a passage that extends continuously from the valve to an upper access opening.

With both of the above designs, elongate tools are directed from above ground through the conduit assembly passages to engage actuators on the valves. The tools control turning of the actuators in opposite directions to selectively open and close the valves.

Existing designs have some inherent problems, some of which are aggravated as the parts thereof corrode and/or are otherwise affected by environmental conditions.

One such problem involves alignment of the conduit passage with the valve actuator. This is an issue primarily with systems utilizing a straddling housing that may be permitted to shift relative to a valve to the point that the valve actuator becomes inaccessible through the conduit assembly passage. This condition may result from a defective installation, shifting from frost, etc. If valve access is required, the ground may have to be removed to allow a worker to get into close proximity to the valve to effect operation thereof and/or to re-install the conduit assembly.

Another problem is a result of the manner in which the upper cap and plug, that is a part thereof, are constructed. Typically, the plug is made from brass so that it is not prone to rusting. The threads on the brass plug mate with threads on another part of the cap, typically made from a dissimilar metal. That other metal is generally prone to rusting or corroding, which could cause the threads to bind, thereby inhibiting turning of the plug for separation. It may become necessary to exert a substantial torque upon the plug to effect separation thereof. This torque may cause another part of the conduit assembly to turn. Depending upon the particular construction, this turning may inflict damage upon the conduit assembly, the housing at the bottom thereof, the valve, and/or the supply line. This again is particularly a problem with systems utilizing a straddling housing that may be turned relative to the valve and supporting line in a manner that inflicts damage thereto.

When this condition exists, the individual seeking to operate the valve has the option of either taking exceptional steps to avoid turning of any other part of the conduit assembly associated with the plug, or gambling that the plug will break free before the failure of any other part of the system under a large turning torque.

The former option represents a significant inconvenience, particularly when utilities budget very little time for their workers to effect access. The latter can have significant consequences, and in a worst case may necessitate a time-consuming repair that could involve replacement of one or more system parts. In an extreme case, the valve itself may have to be accessed, which involves digging around the conduit assembly to create an access opening wide enough to allow a worker to repair, or remove and replace, the damaged structure, potentially including the valve.

In the event the valve itself must be replaced, the utility may have to utilize an upstream shutoff that could inconvenience not only the immediately affected entity, but any entity supplied through an interconnected conduit network downstream of the shutoff.

The above problems may be aggravated by temperature and other weather conditions. For example, rain followed by freezing temperatures may further lock the system components and make separation of the access plug even more difficult.

Another problem that has existed is that it is difficult to engage the valve operating tool with the underground actuator, particularly with conduit assemblies having a substantial vertical length. To address this problem, it is known to utilize extension rods. Such rods have connecting ends attached to the valve actuator and a spaced actuating end that is engageable by an appropriate tool operated from above ground.

Even with an extension rod incorporated into the system, it may be difficult for a user to effect engagement of the tool with the actuating end of the extension rod. To facilitate this process, it is known to provide a number of bends in the extension rod to keep the extension rod generally centered within the conduit assembly. However, incorporating bends adequate to substantially center the extension rod could result in interference between the extension rod and conduit assembly as the extension rod is turned around a vertical axis. Thus, this problem has persisted in spite of past efforts to address it.

A still further problem with conventional systems is that they are prone to tampering by unauthorized individuals. Systems of the above type are designed with a balance between allowing workers reasonable access and precluding unauthorized access. Generally, a casual observer can determine how a cap is installed. Often, without exceptional effort, an unauthorized person may ascertain the easiest way to remove the cap and thereafter tamper with the underground valve or potentially obstruct future operation of the valve.

In spite of these inherent deficiencies with existing systems, the industry has continued to use conventional designs. The industry continues to seek out alternative designs that are economically feasible, while being reliable in terms of their operation, regardless of environmental conditions.

SUMMARY OF THE INVENTION

In one form, the invention is directed to the combination of: an underground valve for a supply line and having an underground actuator through which a state of the valve can be changed to control flow within the supply line; and a conduit assembly embedded in ground material and defining an access passage with a central axis through which above ground access can be obtained to the valve actuator. The conduit assembly has a housing defining a cavity in which at least a portion of the valve resides. The conduit assembly further has a valve base assembly configured to interact with: a) the housing; and b) at least one of: i) the valve; and ii) the supply line to maintain a desired relationship between the housing and the at least one of: i) the valve; and ii) the supply line.

In one form, the supply line has a central axis. The housing and valve base assembly cooperatively extend fully around the central axis of the supply line.

In one form, the valve base assembly has a curved, upwardly opening seat that nominally conforms to the at least one of: i) the valve; and ii) the supply line.

In one form, the housing is made from a urethane material and defines a stop surface/edge and the conduit assembly has a first conduit part that is slidable guidingly relative to the housing along the central axis to abut the stop surface/edge.

In one form, the housing has a sleeve. The conduit assembly has a first conduit part that is slidable guidingly against the sleeve along the central axis of the access passage.

In one form, the housing is defined by a base material in which the sleeve is embedded.

In one form, the housing has an inverted U-shaped receptacle that straddles at least one of: i) the valve; and ii) the supply line.

In one form, the supply line has a central axis. There are components cooperating between the valve base assembly and the at least one of: i) the valve; and ii) the supply line that are keyed to limit movement of the valve base assembly relative to the supply line along the supply line central axis.

In one form, the conduit assembly further has a second conduit part that is telescopingly engaged with the first conduit part.

In one form, the housing and first and second conduit parts are each made from a non-metal material.

In one form, the conduit assembly has an entry opening to the access passage. The conduit assembly further has a cap that can be selectively changed between: a) a first state wherein the cap blocks the entry opening; and b) a second state wherein above ground access can be gained to the valve actuator through the entry opening and access passage. The cap is made from a non-metal material.

In one form, the underground actuator is operated by turning around an axis. The combination further includes an extension rod that extends upwardly from the underground actuator within the access passage and an extension rod support that is attached to the extension rod and acts against a surface bounding the access passage.

In one form, the cap has a cutout/notch formed therein configured to receive a part of a tool that can be used to pry the cap out of its first state.

In one form, the invention is directed to the combination of: an underground valve for a supply line and having an underground actuator through which a state of the valve can be changed to control flow within the supply line; and a conduit assembly embedded in ground material and defining an access passage with a central axis through which above ground access can be obtained to the valve actuator. The conduit assembly has a housing defining a cavity in which at least a portion of the valve resides. The housing has an inverted U-shaped receptacle that straddles and engages at least one of: i) the valve; and ii) the supply line. The housing is made from a non-metal material.

In one form, the housing is made from urethane and defines a stop surface/edge. The conduit assembly has a first conduit part that is slidable guidingly relative to the housing along the central axis to abut the stop surface/edge.

In one form, the housing has a sleeve. The conduit assembly has a first conduit part that is slidable guidingly against the sleeve along the central axis of the access passage.

In one form, the housing is defined by a base material in which the sleeve is embedded.

In one form, the conduit assembly further has a second conduit part that is telescopingly engaged with the first conduit part.

In one form, the housing and first and second conduit parts are each made from a non-metal material.

In one form, the conduit assembly has an entry opening to the access passage. The conduit assembly further has a cap that can be selectively changed between: a) a first state wherein the cap blocks the entry opening; and b) a second state wherein above ground access can be gained to the valve actuator through the entry opening and access passage. The cap is made from a non-metal material.

In one form, the invention is directed to a method of installing a conduit assembly to facilitate controlled access to an actuator on an underground valve. The method includes the steps of: providing a combination described above; repositioning the housing so that the U-shaped receptacle straddles the at least one of: i) the valve; and ii) the supply line; sliding one end of the first conduit part against the sleeve along the central axis of the access passage; cutting the first conduit part at a second location so that the first conduit part has a selected length between the one end and the second location; telescopingly engaging the second conduit part with the first conduit part so that the first and second conduit parts have a desired combined length; and compacting material around the conduit assembly.

In one form, the supply line has a central axis. The method of installing a conduit assembly further includes the step of interconnecting the housing and the at least one of: i) the valve; and ii) the supply line so that the housing and the at least one of: i) the valve; and ii) the supply line are keyed to limit movement of the housing relative to the supply line along the supply line central axis.

BRIEF DESCRIPTION OF THE DRAWINGS

FIG. 1 is a schematic representation of a conduit assembly, according to the present invention, in an operative state in relationship to a valve associated with a supply line;

FIG. 2 is a perspective view of a prior art conduit assembly in an operative state relative to a valve on a supply line;

FIG. 3 is an enlarged, partial, cross-sectional view of the conduit assembly taken along line 3-3 of FIG. 2;

FIG. 6 is a view as in FIG. 2 of a modified form of prior art conduit assembly in an operative state relative to a valve on a supply line;

FIG. 7 is a schematic representation of cooperating parts on a cap and another part of an inventive form of the conduit assembly;

FIG. 8 is a view as in FIG. 6 showing a specific form of the inventive conduit assembly, according to the invention;

FIG. 9 is an enlarged, side elevation view of a first conduit part on the inventive conduit assembly and showing a portion of a cooperating second conduit part;

FIG. 10 is a view as in FIG. 9 wherein the first conduit part is turned through 90°;

FIG. 11 is an enlarged, cross-sectional view of the conduit parts taken along line 11-11 of FIG. 10;

FIG. 12 is a cross-sectional view of the first conduit part taken along line 12-12 of FIG. 10;

FIG. 13 is an enlarged view of a portion of the conduit part within the circle in FIG. 12;

FIG. 14 is an exploded, perspective view of the components in FIGS. 9-13;

FIG. 15 is a flow diagram representation of a method of installing a conduit assembly, according to the invention, to facilitate controlled access to an actuator on an underground valve;

FIG. 16 is a view as in FIG. 6 of another form of prior art conduit assembly in an operative state relative to a valve on a supply line;

FIG. 17 is an exploded perspective view of the components shown in FIG. 16;

FIG. 18 is an enlarged, perspective view of an upper conduit part on the conduit assembly in FIGS. 16 and 17;

FIGS. 19-21 show the conduit part of FIG. 18 with different defects for which repair is required;

FIG. 29 is an exploded perspective view corresponding to that in FIG. 17 wherein a repair assembly is used after the conduit part is prepared as in FIG. 28;

FIG. 30 is a view as in FIG. 29 with the parts assembled;

FIG. 31 is an enlarged, perspective view of the cap used on the repair assembly in FIGS. 29 and 30;

FIG. 32 is a side elevation view of the cap in FIG. 31;

FIG. 33 is a bottom view of the cap in FIGS. 31 and 32;

FIG. 34 is a cross-sectional view of the cap taken along line 34-34 of FIG. 32;

FIG. 35 is a perspective view of a modified form of repair assembly, according to the invention;

FIG. 36 is an enlarged, cross-sectional view of the repair assembly taken along lines 36-36 of FIG. 35;

FIG. 37 is a bottom view of a cap on the repair assembly in FIGS. 35 and 36;

FIG. 40 is an enlarged, perspective view of a cap that is part of the repair assembly in FIGS. 38 and 39;

FIG. 41 is a side elevation view of the cap in FIG. 40;

FIG. 42 is a bottom view of the cap in FIGS. 40 and 41;

FIG. 43 is an enlarged, fragmentary, perspective view of a conventional upper conduit part, as shown in FIG. 2, that is broken off at an upper threaded portion;

FIG. 44 is a view as in FIG. 43 wherein a conventional repair cap assembly has been placed over the fractured conduit part;

FIG. 45 is an exploded perspective view of the components shown in FIG. 44;

FIG. 46 is a cross-sectional view of the conduit part with the repair cap assembly taken along line 46-46 of FIG. 44;

FIG. 47 is a perspective view of a conventional tool that is used to turn access caps and cooperate with actuators underground to operate valves;

FIG. 48 is an enlarged, side elevation view of the actuating tool in FIG. 47;

FIG. 49 is an enlarged, end elevation view of the actuating tool in FIG. 47;

FIG. 50 is an enlarged, top view of the actuating tool in FIG. 47;

FIG. 51 is an exploded, perspective view of a further prior art conduit assembly;

FIG. 52 is an exploded, perspective view of a further conduit assembly, according to the present invention;

FIG. 53a is a view as in FIG. 52 with the components assembled;

FIG. 53b is an enlarged view of the portion of the conduit assembly within the circle in FIG. 53a;

FIG. 54 is an enlarged, perspective view of a housing on the conduit assembly in FIGS. 52 and 53;

FIG. 73 is a reduced, perspective view of a conduit piece with the cap in FIGS. 71 and 72 in a closed position;

FIG. 74 is a cross-sectional view of the cap and conduit piece taken along line 74-74 of FIG. 73; and FIG. 75 is an enlarged view of the structure within the circle shown in FIG. 74.

DETAILED DESCRIPTION OF THE PREFERRED EMBODIMENT

Figure 5:
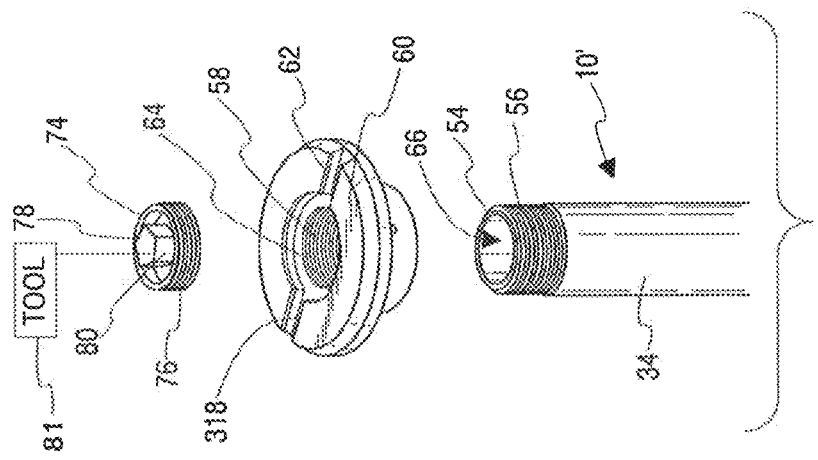
FIG. 5 is an enlarged, exploded, perspective view of a cap at an upper end of a conduit part on the conduit assembly in FIGS. 2-4.
Figure 4:
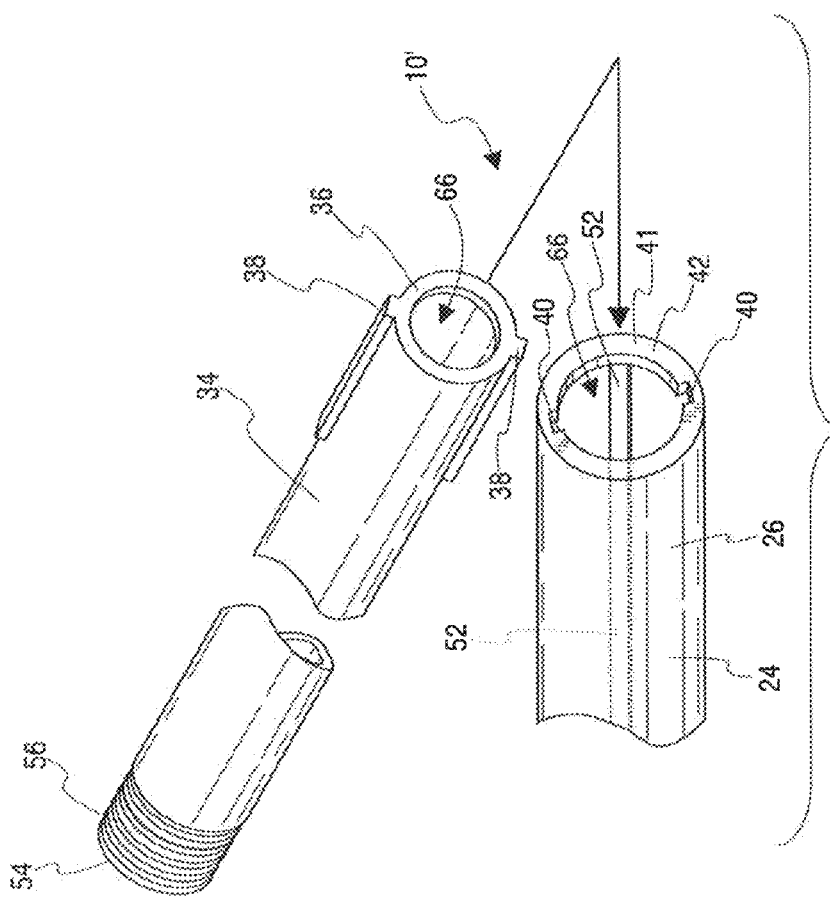
FIG. 4 is an enlarged, fragmentary, exploded, perspective view of cooperating conduit parts on the conduit assembly in FIGS. 2 and 3.
Figure 22:
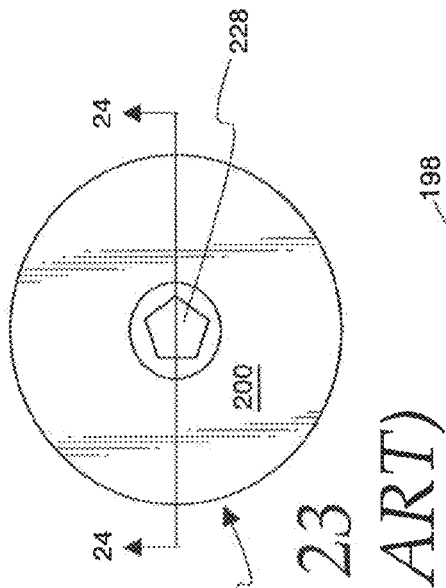
FIG. 22 is an enlarged, perspective view of a conventional replacement cap used on the conduit part in FIG. 18 once damage is inflicted.
Figure 23:
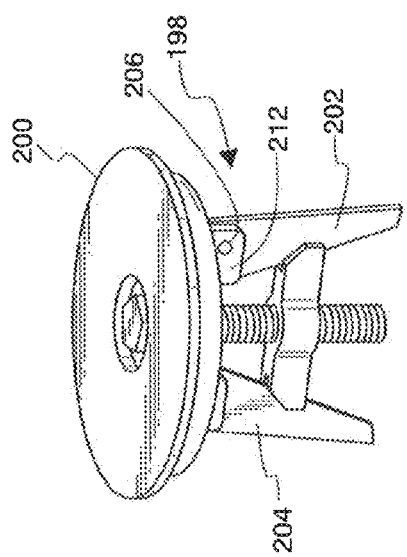
FIG. 23 is a plan view of the replacement cap in FIG. 22.
Figure 24:
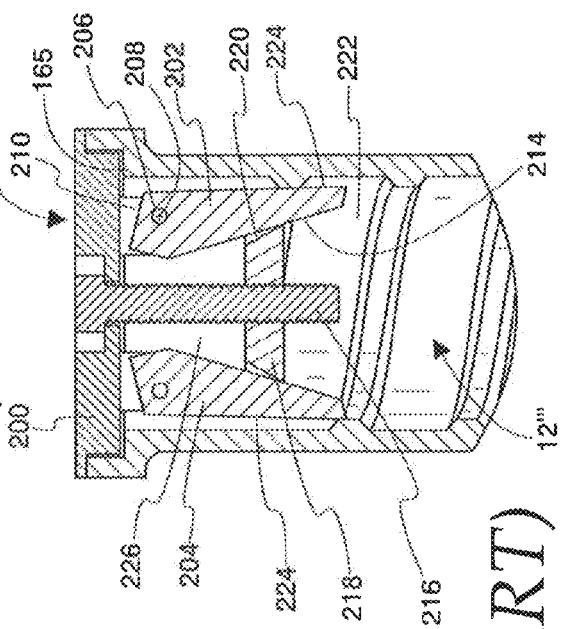
FIG. 24 is a cross-sectional view of the replacement cap in FIGS. 22 and 23 operatively connected to the upper region of the conduit part in FIG. 18.

In FIG. 1, an exemplary form of the invention is shown in schematic form. A conduit assembly at 10 defines an access passage 12 through which above ground access can be gained to an actuator 14 on an underground valve 16. The valve 16 is associated with a supply line 18 for any flowable commodity, such as gas, water, etc. While one specific form of valve is depicted in embodiments described hereinbelow, the invention can be used to cooperate with virtually an unlimited number of different valve configurations offered by different manufacturers. It is conceivable that the supply line 18 could even be capable of electrical conductivity whereby the actuator 14 acts as a switch. The supply line 18 may be any supply line, such as one that branches off as part of a network that supplies individual residences and/or businesses from a main supply. Through the actuator 14, the state of the valve 16 can be changed to control flow within the supply line 18. As examples, the actuator may be a simple on/off type arrangement or one that varies flow volume. As used herein, "valve actuator" is intended to encompass any underground component that has different states that might be accessed and changed through a conduit passage, regardless of the nature of the supply.

The conduit assembly 10 defines an entry opening 20 to the access passage 12. The conduit assembly 10 further has a cap 22 that can be selectively changed between: a) a first state wherein the cap 22 blocks the entry opening 20; and b) a second state wherein access can be gained to the valve actuator 14 through the entry opening 20 and access passage 12. The cap 20 may be fully separated in its second state, though this is not required.

The components shown in FIG. 1 are represented in schematic form to encompass specific forms, hereinbelow described, as well as variations thereof that would be apparent to one skilled in the art with the inventive teachings in hand. To understand the significance of the present invention, some further details of the prior art, as described generally above, will be explained herein, with the associated shortcomings.

Existing conduit assemblies are most commonly made with one of two different designs. A first prior art design is shown at 10' in FIGS. 2-5. The conduit assembly 10' consists of a lower conduit part 24 that is typically made from cast metal. The conduit part 24 has a stepped diameter with a smaller diameter portion 26 and a larger diameter portion 28. The larger diameter portion 28 has internal threads 30 that mate with cooperating threads 32 on a valve 16'.

A separate, upper conduit part 34 is telescopingly engaged with the conduit part 24. The lower end 36 of the conduit part 34 is formed to define diametrically oppositely projecting locking tabs 38, alignable one each with cutouts 40 in a flange 41 at the upper end 42 of the conduit part 24. With the locking tabs 38 and cutouts 40 angularly aligned, the conduit parts 24, 34 can be telescopingly engaged to be movable guidingly relative to each other along a lengthwise axis 44 of the conduit assembly 10'. A friction ring 46 is placed within a radially inwardly opening undercut 48 on the conduit part 24, acts against an outer surface 50 of the conduit part 34 to frictionally grip the conduit part 24, and functions to inhibit free sliding movement of the conduit part 34 relative to the conduit part 24.

The conduit part 24 has diametrically oppositely located ribs 52 each projecting radially inwardly at a location circumferentially midway between the cutouts 40 in a circumferential direction. The ribs 52 extend over potentially the full axial extent of the conduit part 24.

The upper end 54 of the conduit part 34 has external threads 56 thereon. The threads 56 cooperate with internal threads 58 on a cap 60 that is designed to be situated at approximately ground level GL. More specifically, the conduit parts 24, 34 are relatively repositioned so that the combined length L of the conduit parts 24, 34 and cap 60 situates the upper surface 62 of the cap 60 at approximately ground level GL. The conduit parts 24, 34 can be fixed with a selected combined length by turning the conduit part 34 relative to the conduit part 24 around the axis 44. As this occurs, the locking tabs 38 wedge forcibly against the ribs 52 so as to thereby maintain the conduit parts 24, 34 locked against relative axial and angular movement.

With this arrangement, the overall length L of the conduit assembly 10' in the vertical direction is substantially fixed. As a consequence, frost tends to expand compacted material M around the conduit assembly 10' so that it exerts a wedging force between the underside of the cap 60 and the supply line 18, or potentially between the underside of the cap 60 and other upwardly projecting surfaces, such as those produced by the different diameters of, and on, the conduit parts 24, 34. As mentioned in the Background portion herein, these forces could compromise the structure of the conduit assembly 10' and/or might inflict damage upon the valve 16' and/or supply line 18, necessitating underground access to the site at which the damage has occurred.

Typically, the conduit part 34 and cap 60 will both be made from metal. The threads 58 on the cap 60 bound an entry opening 64 and part of an axial access passage 66, extending between the entry opening 64 and the valve 16' and, more particularly, an actuator 70 therefor. A conventional tool 72 has an elongate construction and can be directed from above ground through the entry opening 64, into and through the passage 66, and into engagement with the actuator 70, which can be manipulated from above ground using the tool 72.

Access to the valve actuator 70 is controlled by a plug 74 that has external threads 76 to engage the internal threads 58 on the cap 60. A boss 78 with a pentagonal peripheral surface 80 is integrated into the plug 74 to accommodate a special tool 81 that is engaged with the boss 78 to controllably turn the plug 74 to tighten and release the same. The shape of the boss 78 makes it difficult to turn the plug 74 without having the special tool 81 that cooperates therewith, thereby limiting unauthorized access to the valve actuator 70.

Typically, the cap 60 will be made from metal that may be cast, or otherwise formed. The plug 74 is commonly made from a brass material. As noted in the Background portion herein, the cap 60 and plug 74 are both prone to corroding and/or accumulating moisture that may migrate between the threads 58, 76 thereon and freeze at low temperatures. These conditions each may cause the plug 74 to lock to the cap 60, whereupon torque applied to the boss 78 and the plug 74 may produce sufficient forces on other parts of the conduit assembly 10' and/or valve 16' to inflict damage thereupon.

Damage may also be inflicted by impact forces applied to the upper region of the conduit assembly 10' that is exposed above grade. For example, equipment employed to cut grass, plow snow, etc., may encounter the upper region of the conduit assembly 10' and damage the cap 60 and/or bend or fracture one of the conduit parts 24, 34. An exemplary fracture line that might be created under these circumstances is shown at FL in dotted lines in FIG. 2. Generally, the compacted material M will rigidify the conduit assembly 10' adequately that it is not prone to failing, when impacted, significantly below grade. This problem is aggravated when frost heaves the conduit assembly 10' to expose an additional length of the conduit assembly 10' above ground level GL. Since the upper region of the conduit assembly 10' is conventionally made with metal components, there is little flexibility to absorb impacts, which commonly leads to part failure/fracture.

The other most common configuration of prior art conduit assembly, mentioned above, is shown in FIG. 6 at 10". The conduit assembly 10" differs from the conduit assembly 10' primarily in the configuration of the conduit part 24", corresponding to the conduit part 24, and cooperating with the part 34", corresponding to the part 34. Whereas the conduit part 24 is directly connected to the valve 16', the conduit part 24" is integrated into a cast housing 82 that fits over a valve 16" in a relationship whereby it straddles the valve 16" and the supply line 18. To accomplish this, the cast housing 82 is made with an inverted cup shape with diametrically opposite cutouts 84 (one shown) to accommodate the supply line 18. With this configuration, the conduit assembly 10" does not fixedly connect to the valve 16". However, frost heaving may nonetheless damage the conduit assembly 10" and/or effect misalignment thereof with the valve 16" that may necessitate digging to access the site of failure, that may be a significant distance below ground, and potentially near or at valve level.

The conduit assembly 10" also includes the aforementioned cap 60 and plug 74. In the event that the cap 60 and plug 74 lock, torquing the plug 74 may inflict damage upon parts of the conduit assembly 10" therebelow, including potentially turning the cast housing 82 so that it is forced against the supply 18 and/or valve 16" upon which it might inflict damage.

Details of one exemplary form of the conduit assembly, according to the present invention, as shown schematically in FIG. 1, are shown in FIGS. 7-14.

One aspect of the present invention is the specific manner in which the cap 22 and another part 86 of the conduit assembly 10 interact, as shown schematically in FIG. 7. More specifically, a part 88 of the cap 22 interacts with the part 86 in a manner whereby the parts 86, 88 are relatively moved against each other as the cap 22 is changed between the aforementioned first and second states. According to the invention, at least one of the parts 86, 88 is made from a non-metal material. As explained below, in the specific embodiment, the exemplary parts 86, 88 are in the form of cooperating threads and both made from a non-metal material. However, this is not a requirement as another relatively movable parts arrangement might be utilized to selectively block and expose the entry opening 20 to the access passage 12.

In the specific exemplary form of the conduit assembly 10, the conduit assembly 10 is made up of three separate conduit parts—a first upper conduit part 90, a second conduit part 92, and a third conduit part 94. In its simplest form, the conduit part 90 can be utilized in conjunction with a single, separate, lower conduit part to define the access passage 12 between the entry opening 20 and the valve 16. However, in the depicted embodiment, the conduit part 90 is shown in association with the separate, existing, lower, conduit parts 92, 94, that correspond respectively to the conduit parts 34", 24" shown on the prior art conduit assembly 10" in FIG. 6.

The first conduit part 90 and second conduit part 92 each has a vertical length along the central axis 96 of the conduit parts 90, 92, 94, and the access passage 12 is defined cooperatively thereby. The conduit parts 90, 92 are slidable guidingly in a lengthwise direction, one against the other, to change the effective combined length L1 of the conduit parts 90, 92. The conduit part 90 defines the part/threads 86 that cooperate with the part/threads 88 on the cap 22. For purposes of this disclosure, the cap 22 may be considered to be either separate from, or a part of, the conduit part 90.

While different cooperating mechanical components may be provided on the conduit parts 90, 92 to allow relative lengthwise movement therebetween, in the depicted form, the conduit part 92 fits within the conduit part 90 to produce a telescoping-type arrangement. The conduit part 92 has a generally cylindrical outer surface 97 centered on the lengthwise axis 96.

The first conduit part 90 has a through opening 98 within which the second conduit part 92 is directed. The opening 98 is bounded by a radially inwardly facing surface 100. A plurality, and in this case three, discrete, elongate, axially extending components/ribs 102 project radially inwardly from the radially inwardly facing surface 100 to engage the outer surface 97 of the second conduit part 92 and guide relative sliding movement between the first and second conduit parts 90, 92. The interaction of the ribs 102 and surface 100 causes the conduit parts 90, 92 to be frictionally held against relative angular and axial movement.

Additionally, an annular component/bead 104 projects radially inwardly from the surface 98 adjacent the lower region of the conduit part 90 to engage the outer surface 97 of the second conduit part 92 to establish a seal between the first and second conduit parts 90, 92 to block passage of debris therebetween. The bead 104 preferably extends fully and continuously around the axis 96 and also produces frictional holding forces between the conduit parts 90, 92.

In a preferred form, the first conduit part 90 is designed to translate in a vertical path relative to the conduit part 92, while being guided therealong. Once the material M is compacted around the full vertical extent of the conduit assembly 10, the conduit parts 90, 92 are held together additionally by forces from the compacted material M. Under normal conditions, the embedded conduit part 90 will be held with sufficient force by the compacted material M and the cooperating ribs 102 and surface 100 that it will not tend to shift vertically relative to the conduit part 92. However, under higher forces produced, as by expanded soil under frozen conditions, a threshold releasing force may be developed that causes vertical guided shifting of the conduit part 90 relative to the conduit part 92, thereby avoiding imparting of potentially damaging axial wedging forces upon other parts of the conduit assembly 10.

At the same time, the conduit part 90 is configured so that it will not turn within the compacted material M relative to the conduit part 92 as might allow separation of the conduit part 90 from the conduit part 92, which in turn might give unauthorized access to the valve 16 from above ground.

In the broadest sense, this resistance to turning may be produced by virtually any construction wherein the outer surface 106 of the conduit part 90 has a non-circular shape, as viewed in cross-section along the length of the axis 96. In the depicted embodiment, this non-circular outer peripheral surface 106 is produced by including at least one, and as shown at least two, discrete radial projections 108 at/from the surface 106. The projections 108 are shown in the form of elongate fins at diametrically opposite locations. Each fin 108 has circumferentially oppositely facing surfaces 110, 112 that inhibit turning of the first conduit part 90 within the surrounding compacted material M in which they are embedded.

The cap 22 is made integral with a boss 114 to be engaged by a special tool 116 that may be provided to only authorized personnel. The cap 22 may incorporate any type of turning system, of which there are currently many in this industry and in other industries, wherein the ability to turn a component is restricted to certain authorized personnel.

By turning the cap 22 in one direction around the axis 96, the cap 22 can be tightened through the cooperating threads 86, 88. Opposite turning allows the cap 22 to be separated from the main body 118 of the conduit part 90. In this embodiment, the body 118 has a radially enlarged upper region at 120 that is radially undercut at the top thereof where the threads 86 are formed. A part of the cap 22 nests in the undercut region with the cap 22 tightened. With the cap 22 tightened, an axially facing surface 122 thereon abuts to an axially oppositely facing surface 124 on the body 118 to effect a seal that is redundant to that provided by the cooperating threads 86, 88.

In the preferred form, the threads 86, 88 are both made from a non-metal material. However, advantages can be realized by making either one, and not the other, of the threads 86, 88 from a non-metal material. Preferably, the non-metal material produces an effective seal at the threads 86, 88.

In the most preferred form, the entire cap 22, and the entire body 118 are made from a non-metal material, such as molded urethane. However, the invention contemplates that only selected parts of the cap 22 and body 118 may be made from non-metal material, such as the preferred urethane composition.

By making the parts from urethane, they are not prone to rusting or corroding. Further, urethane provides the requisite structural strength and at the same time is sufficiently flexible that it will flex in response to, and absorb, many forces, imparted by torquing and impact that might cause a failure in metal parts.

To augment the thread holding forces, a plurality of cooperating, discrete components 126, 128 are provided respectively on the body 118 and cap 22. In this embodiment, each component 126 is in the form of an axial projection/nub on the surface 124, with the component 128 in the form of an accommodating, complementary receptacle on the surface 122. A series of these cooperating components 126, 128 are provided in circumferentially spaced locations around the axis 96.

These components 126, 128 serve multiple purposes. First of all, they give the user a feel that the cap 22 is fully tightened. Additionally, they perform a locking function, thereby augmenting the frictional holding force of the threads 86, 88. Thus, they tend to inhibit turning of the cap 22 relative to the body 118 so as to avoid unintended, and unauthorized, loosening of the cap 22.

By strategically using non-metal compositions for some, or all, of the main body 118, and the cap 22, unwanted locking of parts can be avoided. By making the ribs 102 from a non-metal material, they are not prone to locking to the outer surface 97 of the conduit part 92 that is typically made from metal.

In the depicted embodiment for the conduit assembly 10, the conduit parts 92, 94 are telescopingly engaged, one within the other, to change their effective combined length. They may be selectively fixed at a set length using the locking arrangement described for the conduit parts 24, 34 on the conduit assembly 10'. While the effective combined length of the second and third conduit parts 92, 94 becomes fixed, the effective combined length of the embedded conduit parts 90, 92 is allowed to change, as under heaving forces produced by frost in the compacted material M.

The conduit part 90 is capable of cooperating with the conduit parts 24, 34 on the conduit assembly 10' in the same manner as it cooperates with the corresponding components on the conduit assembly 10". No specific description will be made herein of the structure and interaction of the components for that variation.

With the inventive structure, a conduit assembly can be installed by a method, as shown in schematic form in FIG. 15, to facilitate controlled access to an actuator on an underground valve. According to the method, as shown at block 140, a conduit assembly is provided of the type described above. As shown at block 142, second and third conduit parts are placed in operative relationship with an underground valve. As shown at block 144, the combined effective length of the second and third components is set and fixed. A cap is operatively connected as shown at block 146. As shown at block 148, the first conduit part is moved relative to the second conduit part so that the cap is at the desired height, as with the top thereof at grade. As shown at block 150, material is compacted around the conduit assembly with the conduit assembly in its operative state, with the first and second conduit parts remaining slidable guidingly against each other to allow the effective combined length of the first and second conduit parts to change after the material is compacted around the conduit assembly. Of course, it is possible according to the invention to fix the relationship of the first and second conduit parts.

Another form of prior art conduit assembly is shown at 10''' in FIGS. 16-26. The conduit assembly 10''' is associated with a cast housing 82''', corresponding to that shown at 82 in FIG. 6. The housing 82''' straddles a valve 16''' associated with a supply 18.

The depicted conduit assembly 10''' and associated housing 82''' make up what is referred to in the industry as a "buffalo style" system. For purposes of understanding the present invention, the focus needs only to be upon the basic construction of the conduit assembly 10''', and not on how it specifically interacts with the valve 16'''. It suffices to say that the depicted version shows a straddling arrangement corresponding to that in FIG. 6.

As with the conduit assembly 10", the conduit assembly 10''' has upper and lower conduit parts 34''', 24''', respectively. The conduit parts 24''', 34''' define an access passage 12''' with an entry opening 20'''.

Typically, the upper conduit part 34''' is made from metal with an integral, enlarged flange 160 around the entry opening 20''' in which a receptacle 162 is defined for a cast iron cap 164. An undercut, annular seat 165 extends around the entry opening 20''' and defines a support for the cap 164.

An integrally formed tab 166 has an upwardly facing surface 168 that is generally co-planar with an upwardly facing surface 170 bounding the annular seat 162. With this arrangement, the underside 172 of the cap 164 can be facially placed against the surfaces 168, 170 so that the top side 174 of the cap 164 is substantially flush with the top of the flange 160.

The tab 166 has a receptacle 176 that is threaded to receive a threaded anchoring bolt 177 that is made from a brass material.

Typically, with the conduit assembly 10''' operatively positioned and embedded in ground material, as seen in FIG. 16, the cap 164 can be selectively changed between a first state, as shown in FIG. 16, wherein the cap 164 blocks the entry opening 20''', and a second state, as shown in FIG. 17, wherein above-ground access can be gained to the valve 16''' and its associated actuator.

The cap 164 is maintained in its first state by the bolt 177. The bolt 177 has a polygonally shaped head 178 to be engaged by a cooperating special access tool 179 to control access to the valve 16'''.

The conduit parts 24''', 34''' are telescopingly engaged to cause external threads 180 on the conduit part 24''' to engage internal threads 182 on the conduit part 34''' in a manner whereby turning of the upper conduit part 34''' relative to the lower conduit part 24''' around a vertical axis 184 changes the combined length CL of the conduit parts 24''', 34''' along the vertical axis 184. The length is increased or decreased, depending upon the direction of relative turning.

FIG. 18 shows the upper conduit part 34''' fully intact. In FIGS. 19-21, different types of damage are shown as typically inflicted upon the conduit part 34'''.

In FIG. 19, the tab 166 has been partially broken off, leaving a void at 186 in the tab 166 such that it is not usable to effect anchoring of the cap 164.

In FIG. 20, the entire tab 166 is shown broken off, together with a portion of the flange 160 and a portion of a peripheral wall 188 of the conduit part 34'''. As depicted, a substantial void 190 is created which is contiguous with a crack 192 in the wall 188.

In FIG. 21, an upper portion of the peripheral wall 188 is broken away such that the entire flange 160 and tab 166 have been removed.

Once one of the conditions shown in FIGS. 19-21 occurs, any security afforded by the cap 164 is compromised. One option when any of these conditions occurs is to remove enough of the ground material M to access substantially the full axial length of the conduit part 34''', to allow its separation from the conduit part 24'''. However, given the metal-to-metal threaded engagement between these parts, they are likely to be effectively fused and not practically separable in the field, particularly in below freezing conditions when water is frozen between these parts.

As a result, a secondary repair measure has been adopted utilizing a replacement cap 198, as shown in FIGS. 22-26. The replacement cap 198 consists of a disk-shaped cover 200 that can be placed against the annular seat 165 with the damaged state as shown in FIGS. 19 and 20, wherein at least part of the flange 160 and seat 165 remain intact.

The cap 198 has a pair of locking arms 202, 204 located at diametrically opposite locations at the underside of the cover 200. Each locking arm 202, 204 is connected to the cover 200 in like fashion. Exemplary locking arm 202 is mounted by a pin 206 for pivoting movement about a horizontal axis 208. The pin 206 extends through a pair of depending, flat tabs 210, 212, integral with the cover 200, and also through the locking arm 202 therebetween. The locking arm 202 has a radially inwardly facing cam edge 214.

The locking bolt 216 is threadably engaged with a cam block 218 with an angled cam surface 220 that cooperates with the cam edge 214. Turning of the locking bolt 216 in one direction causes the block 218 to move vertically upwardly relative to the cover 200, thereby camming each of the locking arms 202, 204 radially outwardly to cause edges 222, 224, respectively thereon, to bear against a radially inwardly facing surface 226 bounding the access passage 12'''. The locking bolt 216 has the aforementioned polygonally shaped head 228, included for purposes of limiting access.

Figure 26:
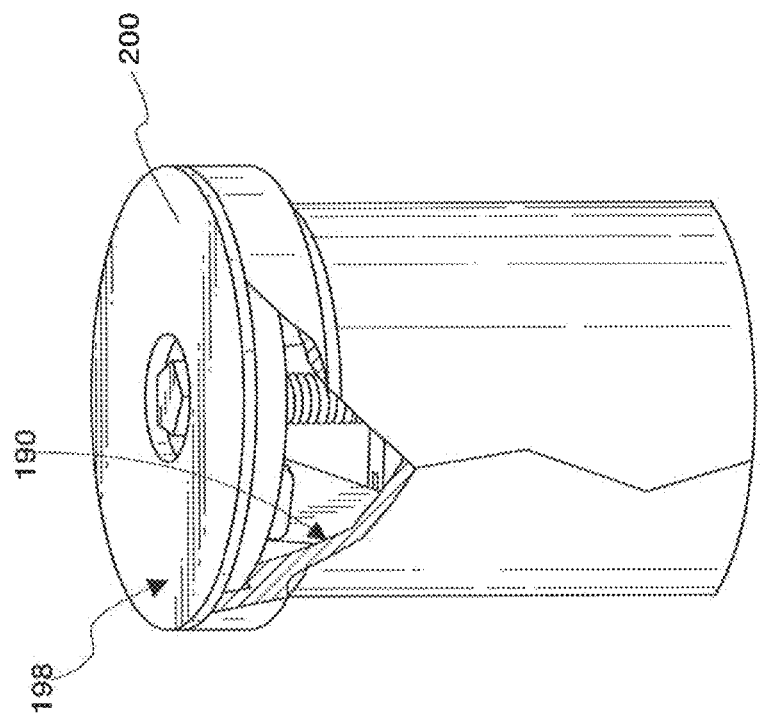
FIG. 26 is a view as in FIG. 25 with the conduit part having the FIG. 20 condition.
Figure 25:
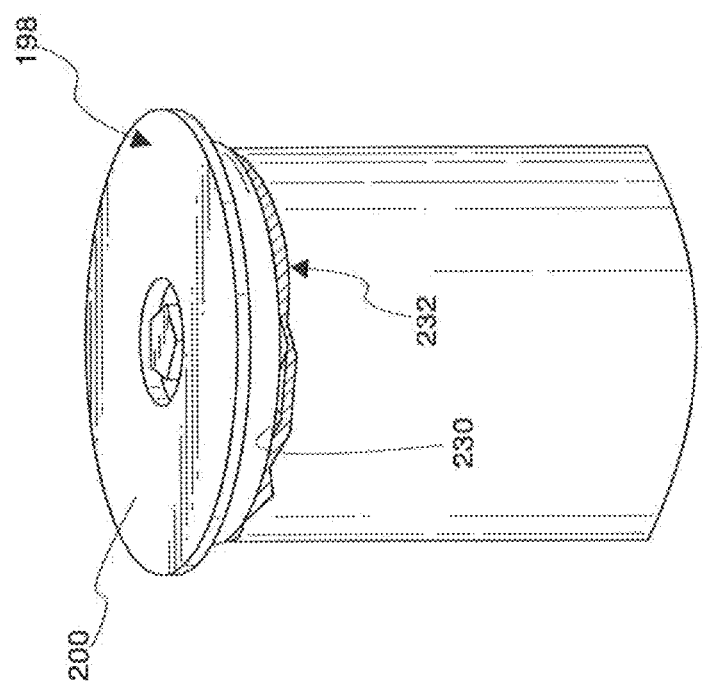
FIG. 25 is a perspective view of the replacement cap in FIG. 22 operatively connected with the conduit part in the condition shown in FIG. 21.

The replacement cap 198 is generally effective for dealing with the repair condition shown in FIG. 19. The replacement cap 198, as used on the conduit part 34''' with the condition shown in FIG. 20, leaves a significant part of the aforementioned void 190 exposed, as seen in FIG. 26. Consequently, moisture and solid foreign matter may migrate through the void 190 into the access passage 12''' to eventually build up to the point that it may be difficult or impossible to control the valve 16''' from above ground.

The replacement cap 198 is likewise less than fully effective when used on the conduit part 34''' with the condition as shown in FIG. 21. As shown also in FIGS. 21 and 25, a jagged upper edge 230 causes a void/gap 232 to be maintained that again permits the ingress of foreign matter that may be solid or liquid in form.

According to the present invention, and as shown in FIGS. 27-34, the conduit part 34''' on the conduit assembly 10''' is modified and used in conjunction with a repair assembly 234 to effect field repair.

Figure 28:
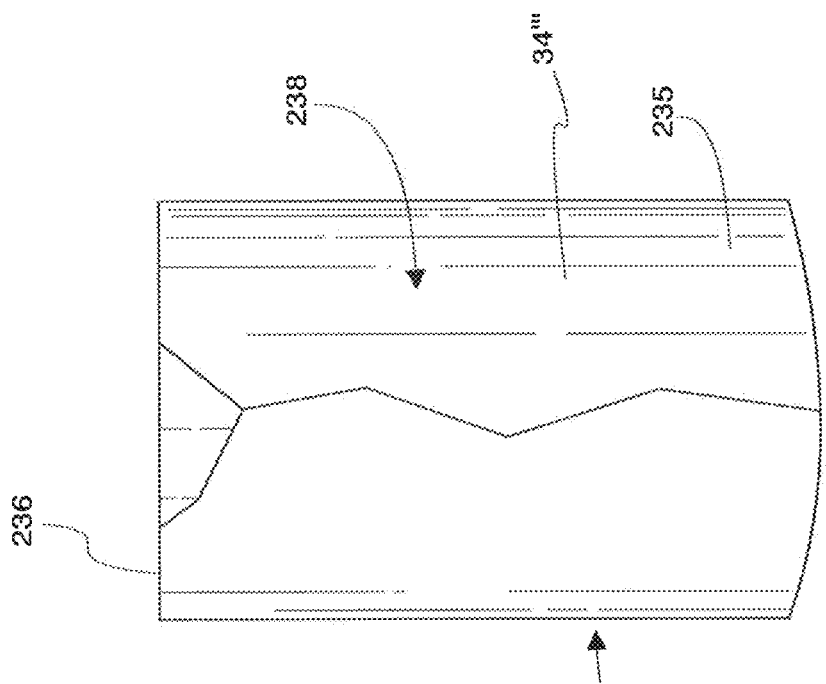
FIG. 28 is a view as in FIG. 27 wherein part of the damaged portion of the conduit part is removed preparatory to repair.
Figure 27:
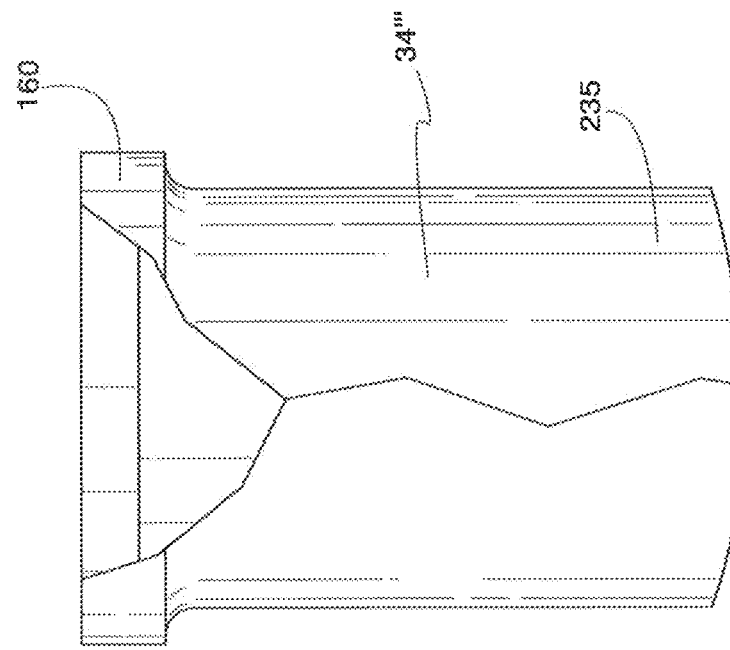
FIG. 27 is an enlarged, elevation view of the conduit part having the condition in FIG. 20.
Figure 38:
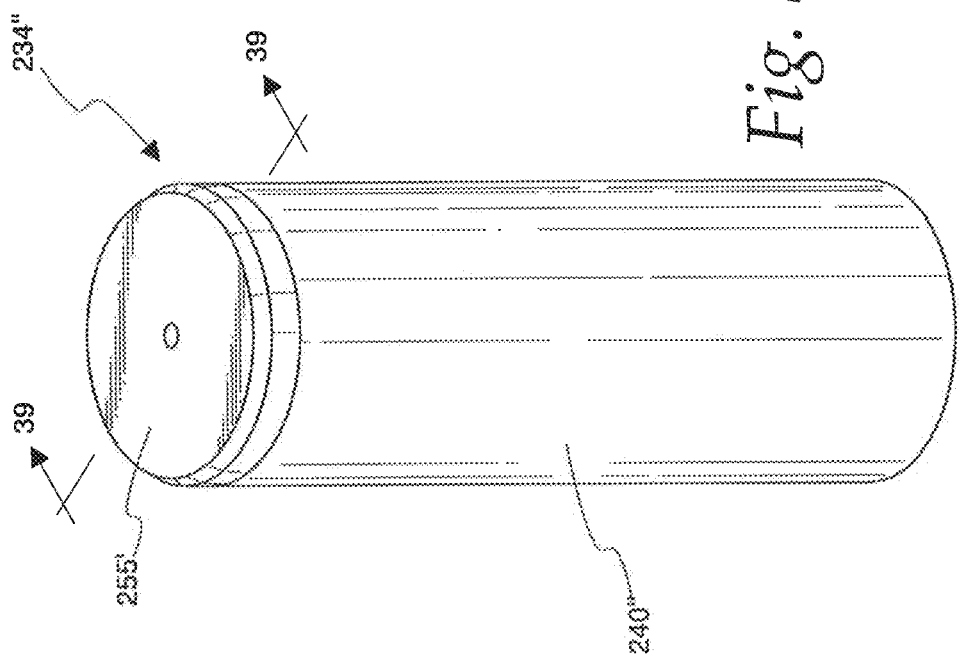
FIG. 38 is a perspective view of a further modified form of repair assembly according to the invention.
Figure 39:
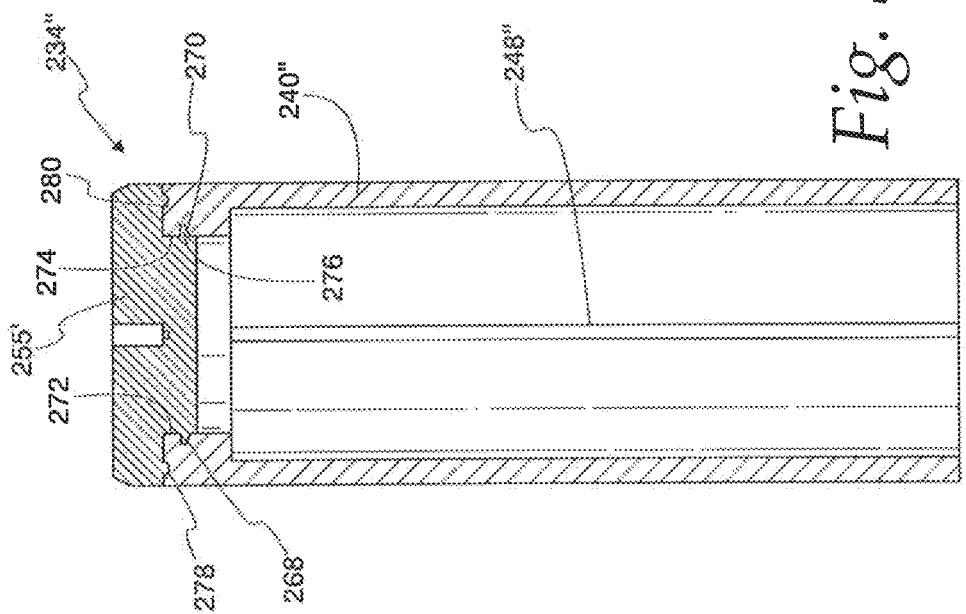
FIG. 39 is a cross-sectional view of the repair assembly taken along line 39-39 of FIG. 38.
Figure 55:
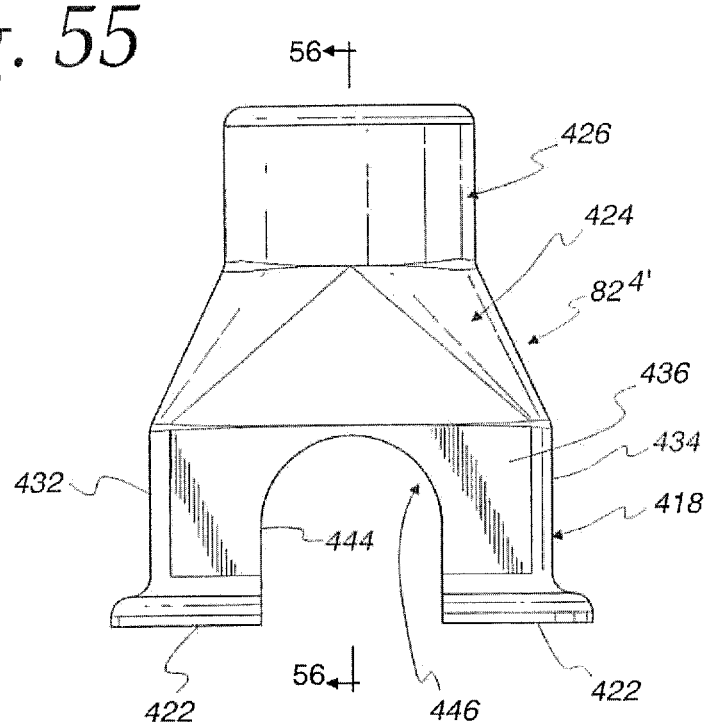
FIG. 55 is a front elevation view of the housing in FIG. 54.

In the event that there is a flange 160 on the existing conduit part 34''' remaining partially or fully intact, as shown in FIG. 27, a portion of the length of the conduit part 34''' at its upper end is removed to eliminate that portion of the conduit part 34''' having a diameter larger than the main portion 235 of the wall 188. Typically the removal will be effected by a cutting step. This exposes an upper edge 236 defined by a remaining portion 238 of the conduit assembly 10'''. As explained below, the edge 236 does not have to be cleanly cut, nor does the entire defect have to be removed as part of the removed length, as seen in FIG. 28.

The repair assembly 234 consists of a conduit piece 240 that defines an upper entry opening 242 and slides over the top region of the conduit part 34'''. The conduit piece 240, once engaged with the conduit part 34''', is moved axially guidingly against the conduit part 34''', making up part of the remaining portion 238 of the conduit assembly 10''', to thereby situate the entry opening 242 at a desired axial location, preferably at or adjacent to ground level.

An inside, radially inwardly facing surface 244 bounding that portion of the access passage 12''' defined by the conduit piece 240 may be closely conformed to the radially outwardly facing surface 246 on the conduit part 34'''. Alternatively, an arrangement as shown in FIGS. 11 and 12 might be utilized. As seen in FIG. 33, radially inwardly projecting components 248, spaced circumferentially around the inside surface 244, may cooperatively engage the radially outwardly facing surface 246 to cause the radially projecting components 248 and radially inwardly facing surface 244 to engage so as to frictionally resist relative axial movement between the conduit piece 240 and conduit part 34'''. While three such components 248 are shown in FIG. 33, a single component 248 might be utilized, or a number in excess of three might be utilized. This interaction promotes guiding of the telescopingly engaged conduit piece 240 and conduit part 34'''. It should be noted that the components 248 might be provided on the conduit part 34''' to engage the surface 242 to function in the same manner.

An upper flange 250, within which the entry opening 242 is formed, has threads 252 thereon formed around the entry opening 242 to cooperate with threads 254 on a cap 255 that is utilized to selectively block and expose the entry opening 242.

In a preferred form, both the cap 255 and the conduit piece 240 are made from a non-metal material. One preferred composition is urethane.

In this embodiment, the conduit piece 240 has a plurality of projecting components 256 spaced circumferentially equidistantly around the flange 250. While six such components 256 are shown, this number is not critical—one or more than six might be utilized. The cap 255 has a corresponding number of receptacles 258 at an axially facing underside surface 260 that faces axially oppositely to the flange surface 261 upon which the components 256 are located. As the cap 255 is tightened, the projecting components 256 are pressed one each into the receptacles 258 so as to resist turning of the cap 255.

A polygonally-shaped turning head 262 is integrally formed with the cap 255 to facilitate turning by a matched tool. Again, this construction is designed for security purposes.

The cap 255 has a different construction than the cap 164, and by reason of the molded construction described, makes possible a positive seal between the cap 255 and conduit piece 240 at the entry opening 242.

With the above-described construction, ground material M can be removed from around the damaged conduit assembly 10''' adequately to expose enough of the conduit part 34''' to allow removal of the damaged flange region. The conduit piece 240 can then be slid in place and translated axially downwardly to a desired height. By firmly compacting ground material M around the conduit piece 240 after it is assembled, substantial resistance to turning of the conduit piece 240 relative to the conduit part 34'' is created.

As an alternative to using a conduit piece that surrounds the upper region of the conduit part 34''', as seen in FIGS. 35-37, a modified form of conduit piece 240' can be used with radially outwardly projecting components 256' that cooperatively engage the radially inwardly facing surface 264 (FIG. 29) on the conduit part 34'''. The conduit piece 240' and cap 255 cooperatively make up a modified form of repair assembly 234'. The cap 255 cooperates with the conduit piece 240' in the same manner that the cap 255 cooperates with the conduit piece 240.

With the repair assembly 234', the conduit piece 240' is simply translated into the conduit part 34''' under pressure until a downwardly facing annular edge 266 thereon abuts to the edge 236 (FIG. 28) formed by cutting away at least the damaged flange 160.

A cylindrical body 267 on the conduit piece 240' can be cut to an appropriate length in the field so that the cap 255 resides at a desired height. The body 267 and cap 255 are both preferably made from a non-metal/urethane material that lends itself to convenient field cutting.

A further modified form of repair assembly is shown at 234'' in FIGS. 38-42. The repair assembly 234'' utilizes a conduit piece 240'' that is configured generally as the conduit piece 240, to surround the upper region of the conduit part 34'''. Friction/guide components 248'' are utilized for the same purpose as the aforementioned, corresponding components 248, 248'.

There are two primary distinctions between the repair assemblies 234 and 234''. First of all, a cap 255' is snap connected to the conduit piece 240'' as opposed to being threaded thereto. To accomplish this, an annular bead 268 is provided around the cap 255' with an angled edge 270. As the cap 255' is pressed downwardly, the bead 258 is deformed as the edge bears against a surface 272 surrounding an entry opening 274. With the cap 255' fully seated, the deformed bead 258 aligns with a complementarily-shaped receptacle 276 into which the bead 268 springs. The bead 258 blocks axial movement of the cap 255' and thereby releasably maintains the connection between the cap 255' and conduit piece 240''. The cap may be pried off when access to an associated underground valve is needed.

The second difference resides in the provision of an annular sealing component 278 on the cap 255' that fits in a complementary receptacle 280 with the cap 255' fully seated. With the cap 255' placed operatively upon the conduit piece 240'', the sealing component 278 is pressed into the receptacle 280.

It is contemplated that this sealing arrangement might be utilized in any of the other embodiments, such as on the repair assembly 234'.

Preferably, the conduit piece 240''' and cap 255' are made from a non-metal/urethane material.

Referring to FIGS. 5 and 43-46, another commonly recurring field condition is depicted, together with conventional structure utilized to effect on-site repairs. Frost heaving and/or impact may cause the threads 56 on the conduit part 34 to break off in or below the cap 60, as shown in FIG. 43.

A repair cap assembly 300 has a cylindrical sleeve 302 with a cap 304 formed integrally therewith. The repair cap assembly 300 is typically made from cast metal. The upper region of the repair cap assembly 300 has the same general configuration as the cap 60, including internal threads 305 to mate with the external threads 76 on the plug 74.

The sleeve 302 has an inside surface 306 that can be slid guidingly downwardly against the outside surface of the conduit part 34 until an upper edge 308, defined by the fractured conduit part 34, abuts an edge 310 defined by a step between the inside surface 306 and a smaller diameter region at which the threads 305 are formed.

Set screws 312 are directed one each through vertically spaced, radial bores 314 which are threaded to engage external threads 316 on the set screws 312. By tightening the set screws 312, the repair cap assembly 300 can be fixed at a desired vertical height relative to the conduit part 34.

Replacement of metal parts with metal parts, in the system shown in FIGS. 44-46, reintroduces the aforementioned problems, among which are the potential fusion between the plug 74 and repair cap assembly 300.

With the conventional cap 60, shown in FIG. 5, and the repair cap assembly 300, a full diameter slot 318, 319 is formed to accommodate a turning tool. In each of the inventive embodiments in which a non-metal component is turned to access the passage 12, alternative turning arrangements are contemplated. While the use of a slot 320 (FIG. 8), corresponding to that shown at 318 and 319, is contemplated, more preferably, the turning may be effected by using, in each inventive embodiment, a polygonally-shaped turning head, as shown at 262 in FIG. 31, and/or spaced openings 323, 324, which cooperate with an actuating tool, as shown at AT in FIGS. 47-50. The tool AT is a multipurpose tool with a conventional construction.

More particularly, the tool AT has an elongate handle 325 which connects to an operating head 326. The operating head 326 is elongate and forms a "T" shape with the length of the handle 325. The operating head 326 has at one of its lengthwise ends a fitting 328 with a polygonal receptacle 330 to make keyed connection to the turning head 262.

At the opposite lengthwise end of the operating head 326, a "Y"-shaped fitting at 332 is formed with spaced prongs 334, 336 that can be placed, one each, in one of the openings 323, 324. With the prongs 334, 336 seated in the openings 323, 324, the elongate handle 325 can be manipulated to produce the desired directional torque upon the cap 255. Alternatively, the fitting 326 can be engaged and used to turn the head 262 in the same manner.

At the end of the elongate handle 325, remote from the operating head 326, a separate fitting 338 is provided to engage the actuator 14 on the valve 16 to effect turning thereof. The T-shaped arrangement of the actuating tool allows the operating head 326 to be grasped and manipulated to turn the elongate handle 325 about its lengthwise axis to operate the valve 16.

The cap depicted in FIG. 31 is exemplary only of the other caps shown herein, and others that could be devised by one skilled in the art with the present invention in hand, that could be operated through a like tool AT.

With all embodiments, the incorporation of non-metal components minimizes the likelihood of extensive damage to the conduit assemblies resulting from impacts and other forces imparted at the exposed, upper regions of the conduit assemblies. These forces may be imparted by lawn mowing equipment, plows, etc. Urethane components will tend to absorb these otherwise potentially damaging forces and may flex or fail without transmitting damaging forces to other parts of the conduit assemblies, and particularly those made from metal. Metal parts, and primarily those reinforced below grade, are thus less likely to be damaged.

In FIG. 51, another existing form of conduit assembly is shown at 10a" with the same general construction as the conduit assembly 10", shown in FIG. 6. A housing 82a is made from a molded, hard plastic material that is bonded to a conduit part 24a", which is also made from plastic. A smaller diameter conduit part 34a" is made from plastic and telescopingly engaged with the conduit part 24a" for controlled length adjustment. A cast iron sleeve/top 400 is fixed to the conduit part 34" and is engaged by a releasable cap 60a made from brass or cast iron, as described above.

While the use of the plastic conduit parts 24a", 34a" eliminates some of the issues associated with the conduit assembly 10" shown in FIG. 6, this design still has significant limitations. The top 400 and cap 60a remain subject to corrosion and fusion. The hard plastic housing 82a tends to be somewhat brittle, particularly when cold, and may not be very durable. It is thus prone to breaking, particularly when it is turned unrestrained against the valve 16" and/or the supply line 18.

A further modified form of conduit assembly, according to the present invention, is shown at $10^{4'}$ in FIGS. 52-59, and addresses at least these latter issues. The conduit assembly $10^{4'}$ cooperates with a valve $16^{4'}$ on a supply line 18 that has a central axis 410. The conduit assembly $10^{4'}$ performs the same general function as those conduit assemblies described above with the conduit assembly $10^{4'}$ in place and ground material compacted therearound. That is, an access passage $12^{4'}$ is defined by the conduit assembly $10^{4'}$ through which above ground access can be obtained to, in this case, a turnable actuator 412 on the valve $16^{4'}$.

In this embodiment, the conduit assembly $10^{4'}$ consists of three sub-assemblies, namely: a) a housing $82^{4'}$; b) a first conduit part $92^{4'}$, corresponding to the aforementioned second conduit part 92; and c) a second conduit part $90^{4'}$, corresponding to the upper conduit part 90 as shown in FIGS. 9-14, and described hereinabove.

While the second conduit part $90^{4'}$ can have a construction that is different than the conduit part 90, for purposes of simplicity, the conduit part $90^{4'}$ will be considered to have the same construction as the conduit part 90.

The conduit part $92^{4'}$ is shown as a single length of non-metal pipe, such as PVC, ABS, etc., with a diameter at its upper end 414 that is selected to telescopingly move within the conduit part $90^{4'}$ to thereby vary a combined length of the conduit parts $90^{4'}$ and $92^{4'}$. Throughout the description herein, the reference to non-metal pipes/conduits is intended to encompass PVC, ABS, and other non-metal materials used conventionally in this, and like applications.

The housing $82^{4'}$ has a body 416 with a generally squared bottom region at 418 that blends into an outturned base flange 420 with a bottom surface 422 that supports the housing $82^{4'}$. The body 416 has a middle region 424 that tapers from the bottom region 418 to a cylindrical top region 426.

The housing $82^{4'}$ may be used either by itself or in conjunction with an optional valve base assembly 428.

The housing $82^{4'}$ has a generally hollow construction to make up a bottom region of the access passage $12^{4'}$, which is defined by a cavity 430 within the housing $82^{4'}$. In this embodiment, the cavity 430 is bounded by opposite wall pairs 432, 434; 436, 438. The walls in the wall pair 436, 438 are longer in a circumferential direction so that the bottom region 418 has an overall rectangular shape as viewed along the vertical axis 440 of the housing $82^{4'}$.

The cavity 430 is dimensioned to accommodate the valve $16^{4'}$, a discrete length of the supply line 18, and the valve base assembly 428, as hereinafter described. To accommodate the valve $16^{4'}$ and supply line 18, the walls 436, 438 have downwardly opening U-shaped surfaces 442, 444, cooperatively defining an inverted U-shaped receptacle 446 that straddles at least the valve $16^{4'}$ and, as depicted, the valve $16^{4'}$ and supply line 18. The straddling relationship may be with or without direct contact. At least a portion of the valve $16^{4'}$ resides within the cavity 430. By itself, the housing $82^{4'}$ may be configured to contact and interact with the valve $16^{4'}$ and/or supply line 18 to maintain a desired relationship therebetween.

A more positive interaction between the housing $82^{4'}$ and valve $16^{4'}$/supply line 18 can be maintained utilizing the valve base assembly 428. The valve base assembly 428 is designed to nest conformingly within the cavity 430 in the portion thereof defined at the bottom region 418 of the body 416. The valve base assembly 428 has a curved, upwardly opening seat 448 that nominally conforms to the valve $16^{4'}$. Depending upon the precise configuration of the valve $16^{4'}$, the seat 448 may also conform nominally to the supply line 18 extending away from the valve $16^{4'}$.

In this embodiment, the valve $16^{4'}$ has a discrete portion 450 projecting radially oppositely from the central valve axis 452 in the region beneath the actuator 412. The discrete portion 450 projects adequately outwardly from the lower region of the valve body 454 such that it can nest in a complementarily-shaped receptacle 456 defined in the valve base assembly 428. By seating the discrete portion 450 in the receptacle 456, the valve $16^{4'}$ and valve base assembly 428 interact and become keyed together to maintain a desired relationship between the housing $82^{4'}$ and the valve $16^{4'}$, and thus the supply line 18. Through this arrangement, movement of the housing $82^{4'}$ relative to the valve $16^{4'}$ and supply line 18, along their respective axes 452, 410, is blocked—if not completely, to within a limited range.

The invention contemplates virtually an unlimited number of different components that might interact between the valve base assembly 428 and one or both of the valve 16$^{4'}$ and supply line 18 to maintain a desired relationship therebetween.

With the described embodiment, once the valve base assembly 428 is engaged with the valve 164' and directed into the cavity 430 by advancing the housing 82$^{4'}$ downwardly relative to the valve 16$^{4'}$ and base assembly 428, the relationship between the housing 824' and the valve 164' becomes substantially fixed, with the axis 440 of the top region 426 generally aligned with the valve actuator 412. In this relationship, the housing 824' and valve base assembly 428 cooperatively extend fully around the axis 410 of the supply line 18 and the axis 452 for the valve 164'.

To accommodate the lower end 458 of the conduit part 92$^{4'}$, a sleeve/bushing 460 is provided at the top region 426 of the housing 82$^{4'}$. The lower end 458 of the conduit part 92$^{4'}$ can be translated guidingly along the axis 440 into the sleeve/bushing receptacle 462 and suitably secured. Of course, the male/female relationship of these parts might be reversed.

Figure 56:
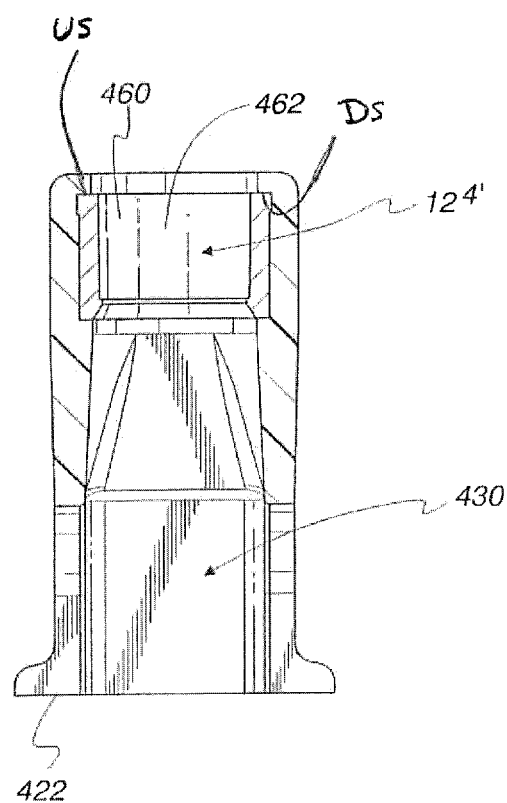
FIG. 56 is a cross-sectional view of the housing taken along line 56-56 of FIG. 55.
Figure 57:
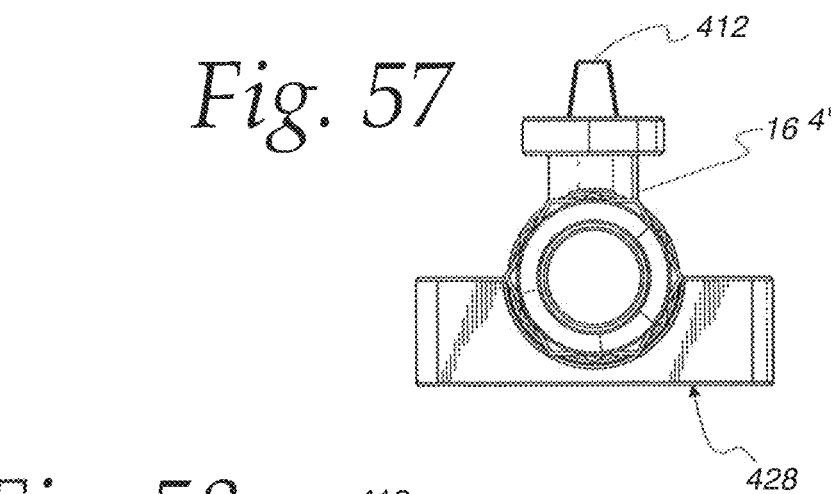
FIG. 57 is an enlarged, side elevation view of the valve in FIGS. 52 and 53 in relationship to a valve base assembly that cooperates with the housing shown in FIGS. 54-56.
Figure 58:
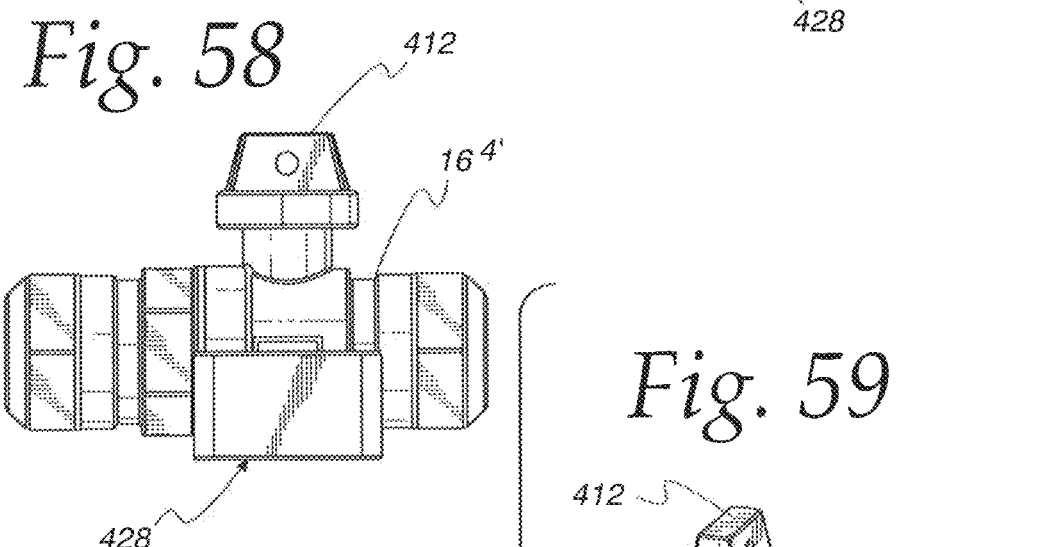
FIG. 58 is a view as in FIG. 57 from a different perspective.
Figure 59:
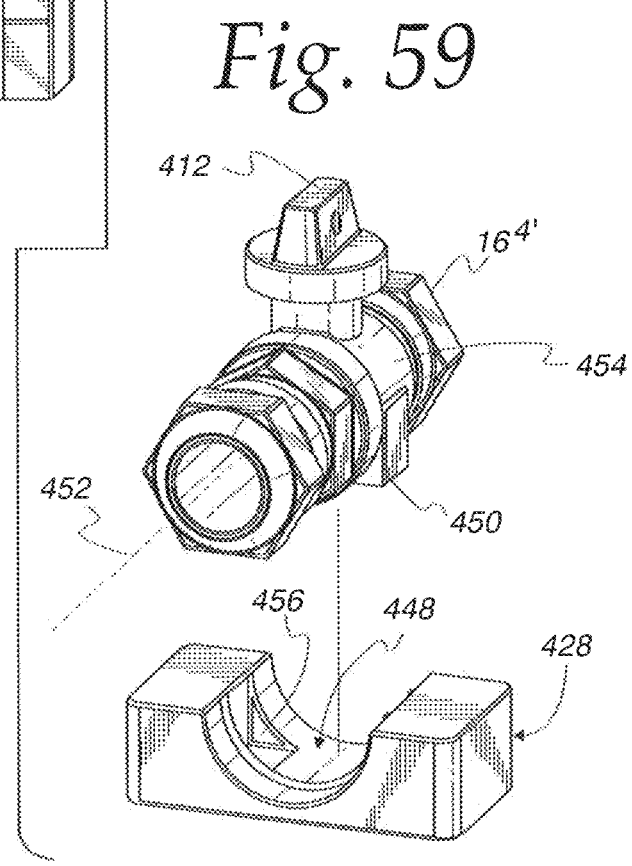
FIG. 59 is an exploded, perspective view of the valve and valve base assembly in FIGS. 57 and 58.

In one preferred form, the body 416 of the housing 82$^{4'}$ is made from a molded urethane material. The sleeve/bushing 460 is made from a PVC material and is molded into the urethane at the top region 426 of the housing 82$^{4'}$. As seen in FIG. 56, the sleeve/bushing 460 has an upwardly facing surface US that confronts a downwardly facing surface DS on the housing 82$^{4'}$.

The conduit part 92$^{4'}$ might be made from the PVC material and bonded to the sleeve/bushing 460 using conventional means/adhesives.

In a preferred form, all of the components making up the conduit assembly 10$^{4'}$—including the housing 82$^{4'}$, the sleeve/bushing 460, the conduit part 92$^{4'}$, and the conduit part 90$^{4'}$, together with the cap 2—are made from non-metal materials, and preferably those described above.

Figure 60:
FIG. 60 is a flow diagram representation of a method of installing a conduit assembly as shown in FIGS. 51-59.

With the structure as described, a method of installing a conduit assembly to facilitate controlled access to an actuator on an underground valve can be performed as shown in flow diagram form in FIG. 60.

As shown at block 464, a conduit assembly, as described above, is provided.

As shown at block 466, the housing is repositioned so that the U-shaped receptacle defined thereby straddles at least one of a valve and a supply line.

As shown at block 468, one end of the first conduit is slid guidingly against and relative to the housing, and specifically the sleeve thereon.

As shown at block 470, the first conduit is cut at a second location so that a first conduit has a selected length between the one end and the second location. The first conduit can be formed with the desired, predetermined length ahead of time or on site. If the latter is contemplated, the first conduit length can be selected to project above ground level for virtually every contemplated field condition, whereby it can be cut by installers to accommodate a cap that ends up flush to ground level.

As shown at block 472, the second conduit is telescopingly engaged with the first conduit to produce a desired combined length.

As shown at block 474, ground material is compacted around the conduit assembly to complete the construction.

Figure 61:
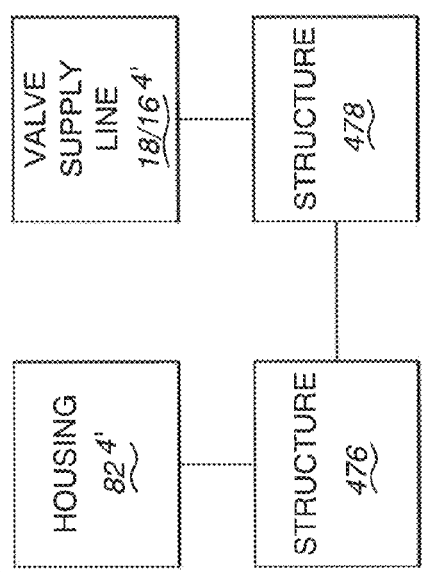
FIG. 61 is a schematic representation of structure cooperating between the housing and valve and/or supply line to maintain a desired relationship therebetween.

In the event that the valve base assembly 428 is used, the process may further include the step of interconnecting the housing 82$^{4'}$ and the at least one of the valve 16$^{4'}$ and supply line 18 utilizing cooperating structure 476, 478, respectively on the housing 82$^{4'}$ and one of the valve 16$^{4'}$ and supply line 18, as shown in schematic form in FIG. 61. Through this arrangement, the housing 82$^{4'}$ and at least one of the valve 16$^{4'}$ and supply line 18 become keyed to limit movement of the housing 82$^{4'}$ relative to the supply line 18 along the supply line central axis 410.

Certain additional improvements over the prior art are described hereinbelow.

Figure 62:
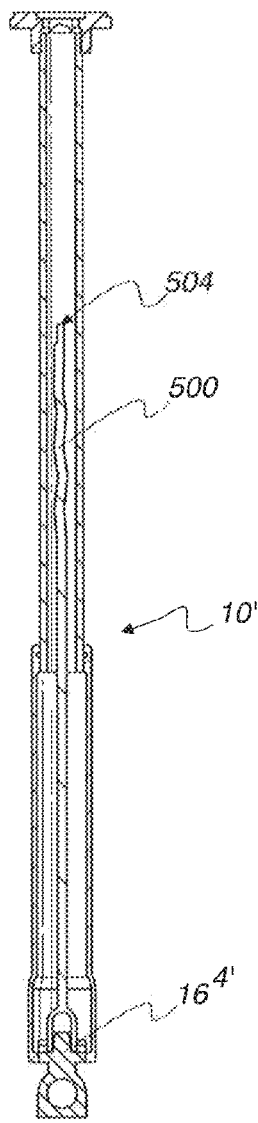
FIG. 62 is a cross-sectional view of a prior art conduit assembly with an extension rod connected to a valve.
Figure 63:
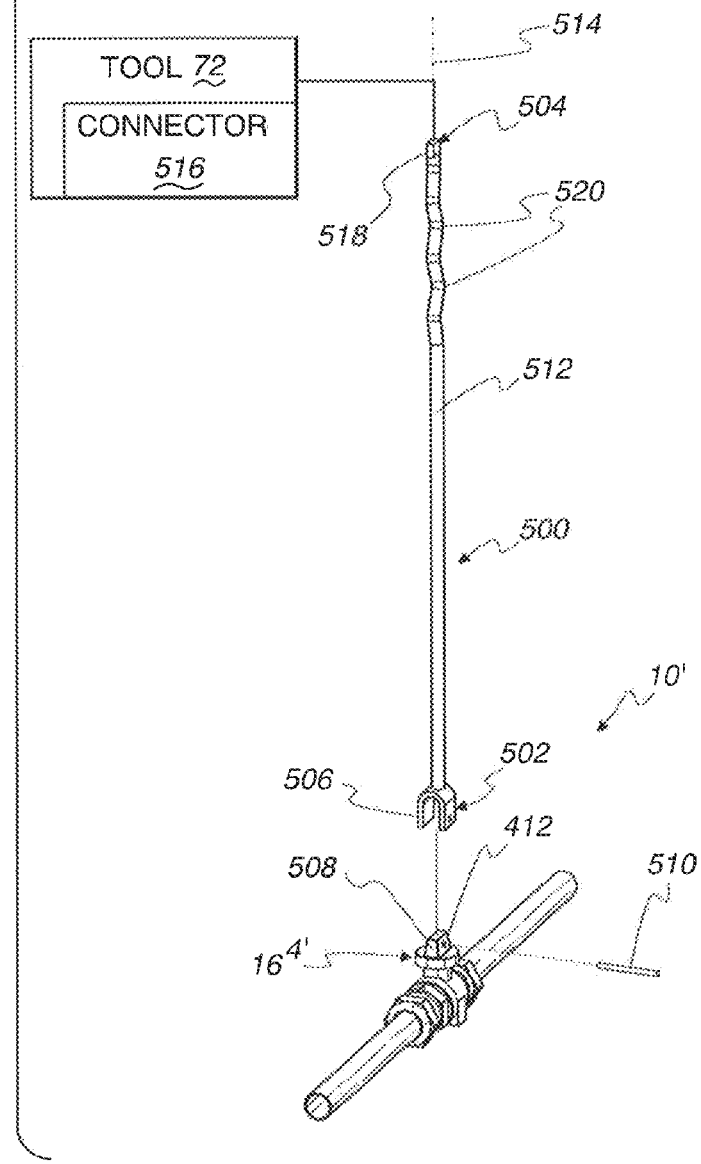
FIG. 63 is an exploded perspective view of the extension rod and valve as shown in FIG. 62.

In FIGS. 62 and 63, the aforementioned prior art conduit assembly 10' is shown with an associated extension rod 500 connected to, and extending upwardly from, the turnable actuator 412 on the valve 16$^{4'}$.

The rod 500 has a lower, connecting end 502 and an upper, actuating end 504. The connecting end 502 has an inverted, U-shaped connector 506 that straddles a block-shaped piece 508 on the top of the actuator 412. With the connector 506 operatively connected to the actuator piece 508, a pin 510 can be directed through the connector 506 and connector piece 508 to effect securement of the parts 506, 508. In this state, an elongate body 512 on the extension rod 500 can be turned around its vertical axis 514, thereby causing a corresponding turning of the valve actuator 412.

The extension rod body 512 has a vertical length that causes the actuating end 504 to reside at least within a couple of feet of the top of the conduit assembly 10'. This allows a person to operate the valve 16$^{4'}$ utilizing a shorter tool 72. At the same time, this configuration makes it easier for a user to engage a connector 516 on the tool 72 with a connector 518 at the actuating end 504 of the extension rod 500. As depicted, the connector 518 has a polygonal shape to make a keyed connection with the connector 516, that may have a complementary shape.

To further assist engagement of the extension rod connector 518 with the tool 72, the extension rod body 512 is provided with a number of bends 520 that cause the body 512 to have an effectively larger diameter so that it remains somewhat centered within the conduit assembly 10'. It is impractical to attempt to form the bends 520 so that the extension rod 500 is precisely centered within the conduit assembly 10'. Otherwise, the extension rod 500 would tend to bind with the conduit assembly 10' as it is turned.

Figure 64:
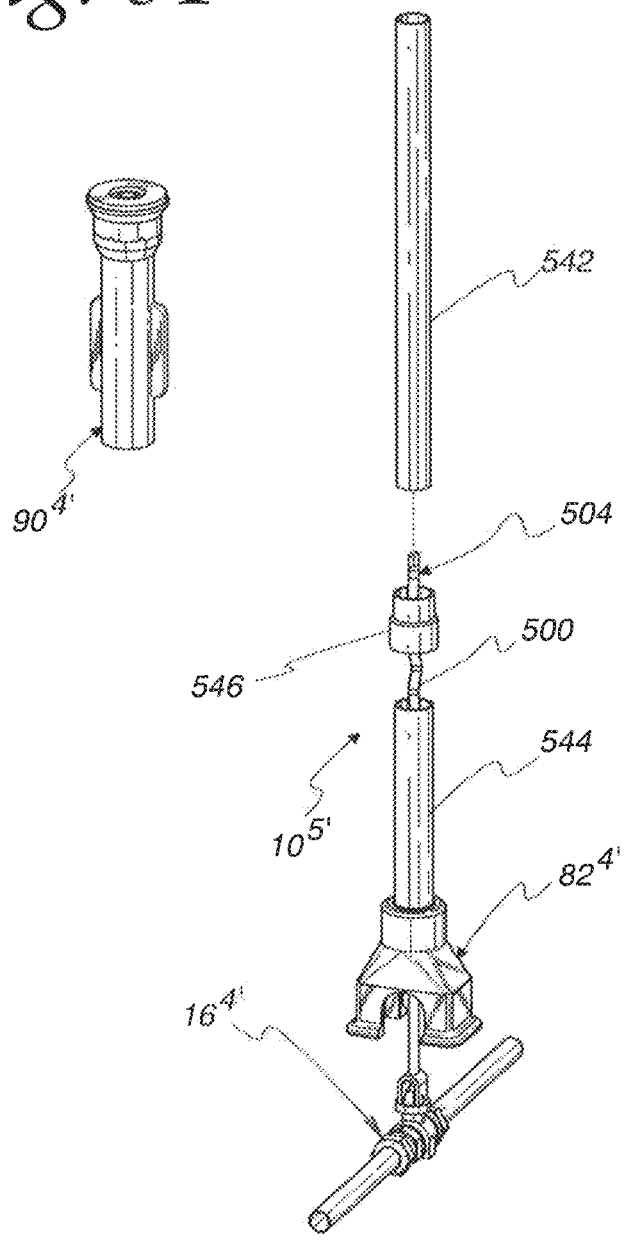
FIG. 64 is an exploded perspective view of a modified form of conduit assembly, according to the invention, and with an extension rod incorporated.
Figure 65:
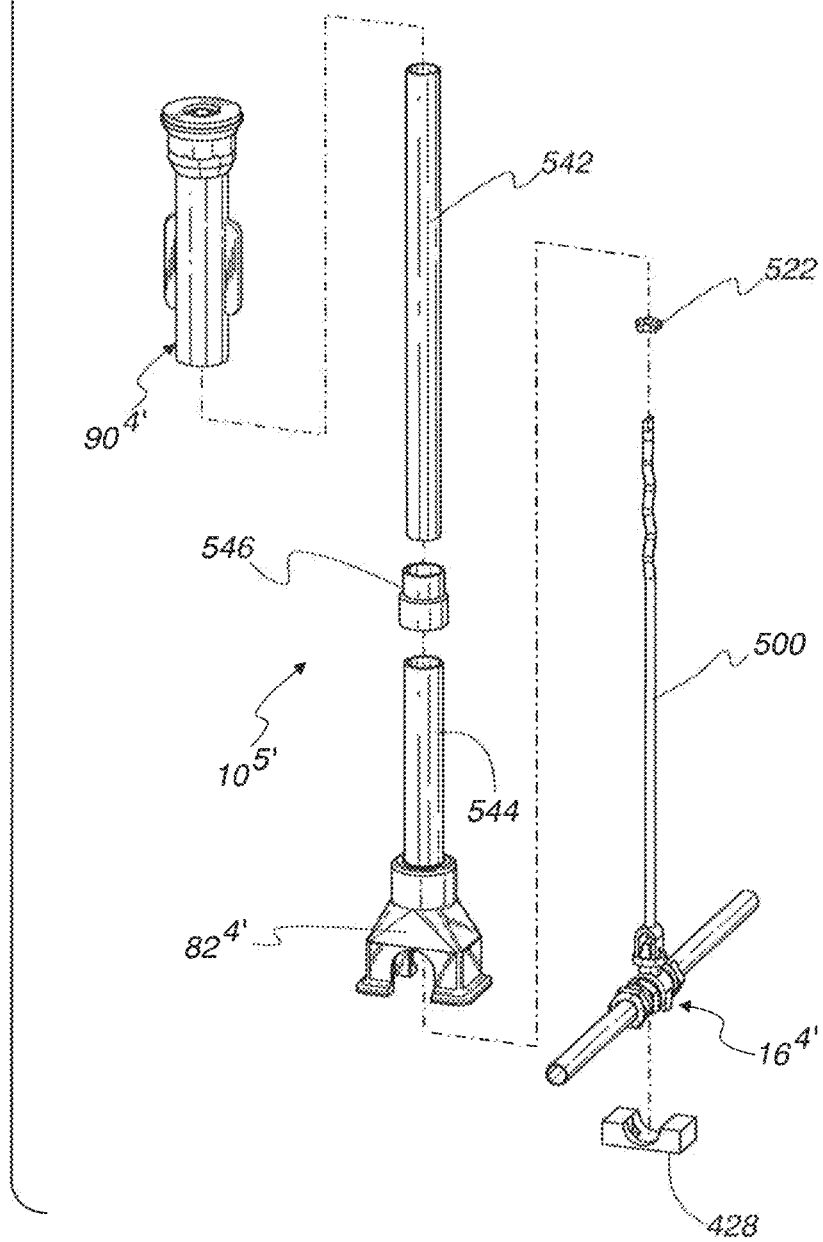
FIG. 65 is an exploded perspective view of the components in FIG. 64 with the conduit assembly shown separated from the extension rod and valve and with an extension rod support, that is obscured in FIG. 64, shown in relationship to the extension rod.
Figure 66:
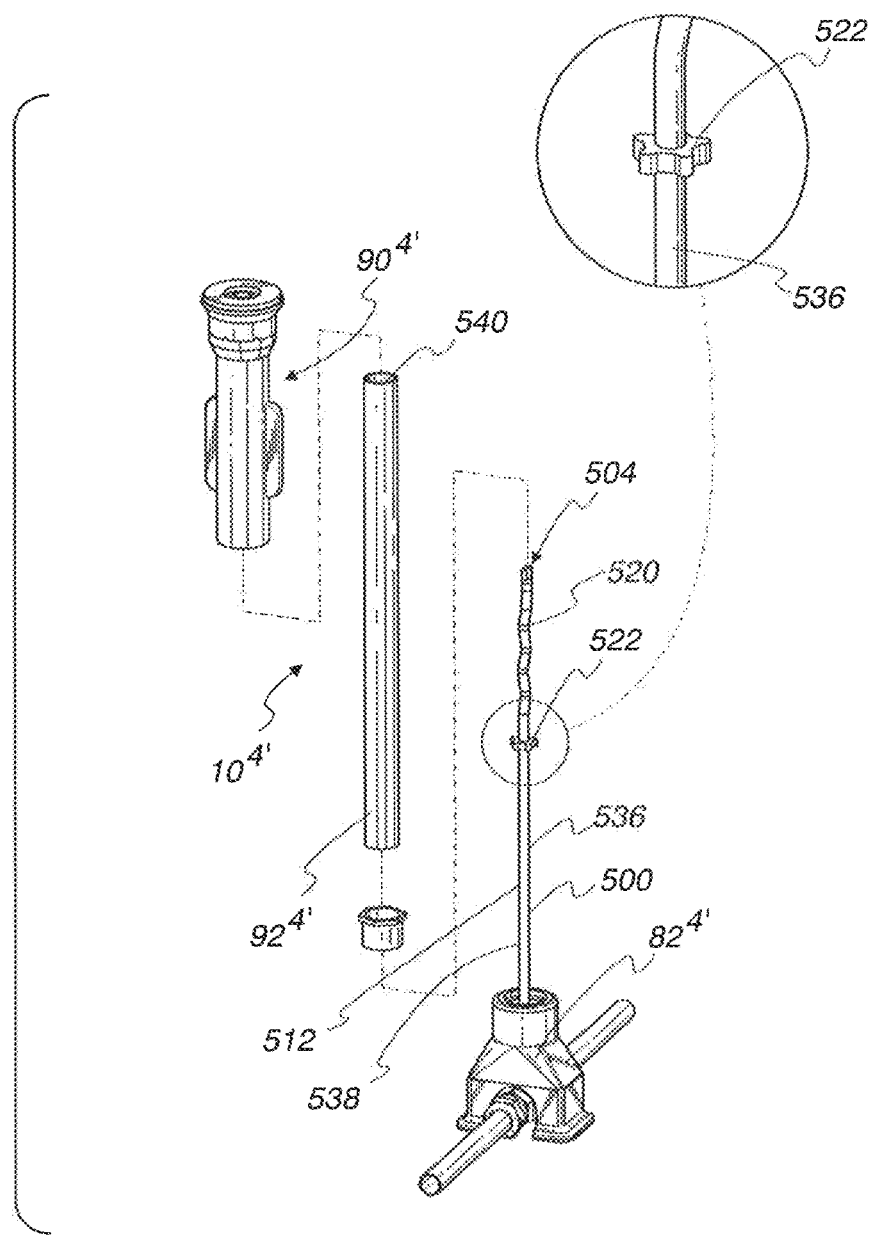
FIG. 66 is an exploded perspective view as in FIG. 65 and with the extension rod support assembled and with a modified form of conduit assembly.
Figure 67:
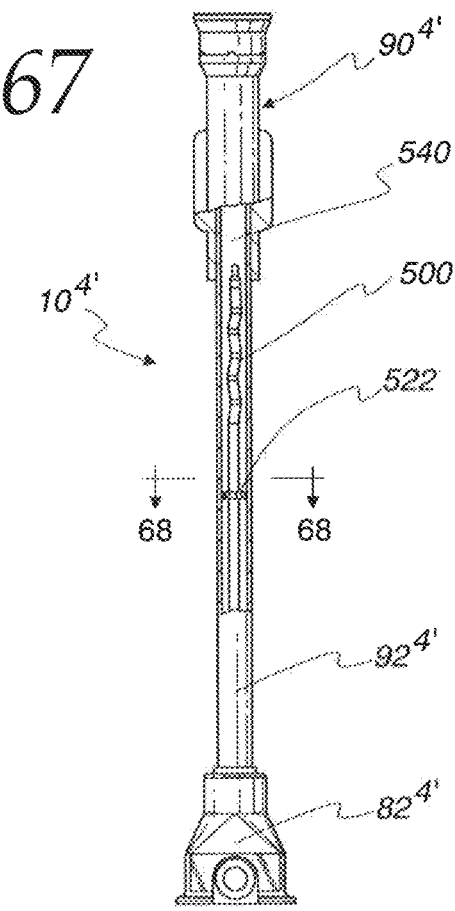
FIG. 67 is a partially sectioned view of the components in FIG. 66 in an assembled state.
Figure 68:
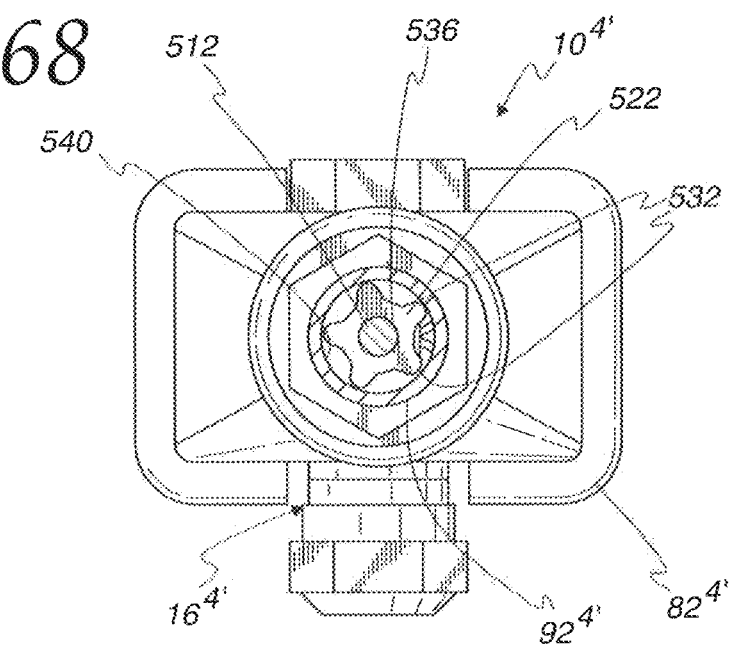
FIG. 68 is an enlarged, cross-sectional view of the conduit assembly and extension rod in FIG. 67 and showing the extension rod support.
Figure 69:
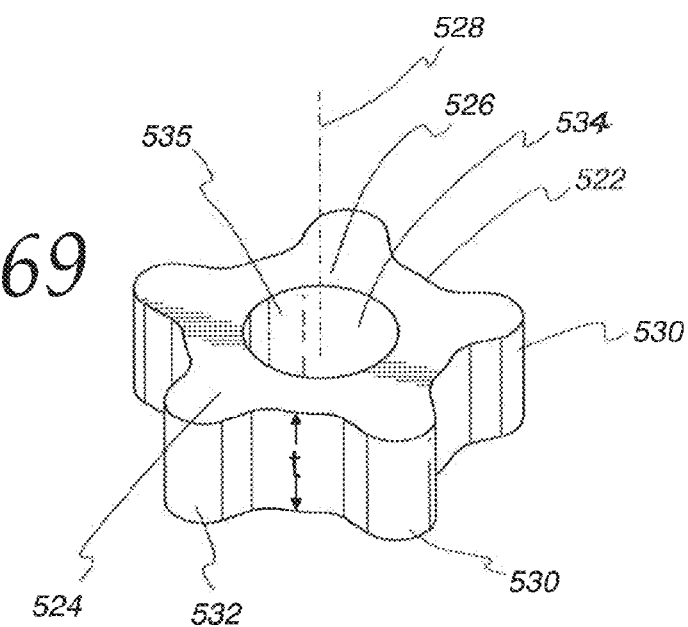
FIG. 69 is an enlarged, perspective view of the extension rod support in FIGS. 64-68.

To effect more precise centering, at least one extension rod support 522 is utilized as shown in FIGS. 64-69, with the extension rod 500 connected to the valve 16$^{4'}$ through the conduit assembly 10$^{4'}$ in each of FIGS. 66-68, and in a modified form thereof in FIGS. 64 and 65.

As seen in FIGS. 66-69, the extension rod support 522 has a body 524 with a generally star-shaped construction with a core part 526 with a central axis 528 from which five separate parts 530 project radially outwardly at regular angular intervals around the axis 528. Each of the parts 530 has a generally rounded free end 532.

The core part 526 has a through opening 534 bounded by a surface 535 that surrounds and firmly embraces the outer surface 536 of a straight length portion 538 of the extension rod 500.

In a preferred form, the thickness t and material of construction for the extension rod support 522 are selected to allow the actuating end 504 of the extension rod 500 to be advanced through the opening 534 to allow the extension rod support 522 to advance over the length at which the bends 520 are formed to reside at the straight length portion 538. The selected thickness t depends upon the flexibility of the particular material.

In one preferred form, the extension rod support 522 is made from a urethane material. The thickness t may be on the order of 0.25 inch to one inch or more. One or multiple extension rod supports 52 may be used at immediately adjacent or spaced locations.

With the extension rod support 52 positioned as shown at an upper region of the straight length portion 538, the actuating end 504 is substantially centered within the conduit assembly $10^{4'}$. The extension rod support 522 preferably frictionally grips the extension rod body 512 aggressively enough that the extension rod support 522 will turn with the centered extension rod 500, with the parts 530 cooperatively guiding this movement by sliding against an inside surface 540 of the conduit part $92^{4'}$.

As noted above, the number of extension rod supports 522 is not limited, nor is the particular construction thereof. Further, different forms of the extension rod support 522 may be utilized in association with a single extension rod 500.

It should be understood that the extension rod support 522 can be utilized with any conduit assembly configuration, as described herein, or otherwise known and devised.

Aside from showing the extension rod supports 522 incorporated, the conduit assemblies $10^{5'}$ in FIGS. 64 and 65 are also of interest as showing an alternative to the use of the single conduit part $92^{4'}$ extending from the housing $82^{4'}$, as shown in FIGS. 66-68, to the conduit part $90^{4'}$.

The housing $82^{4'}$ may have other shapes, such as cylindrical.

As shown in FIGS. 64 and 65, rather than using a single conduit part $92^{4'}$, the corresponding conduit part length is made up of separate upper and lower conduit parts 542, 544, respectively, joined by a coupler 546. The conduit parts 542, 544 and coupler 546 may all be made from a PVC material, or other materials, or with different materials making up different ones of the parts 542, 544, and coupler 546. The multi-part construction, among other things, facilitates on-site adaptation to a particular valve depth.

FIG. 64 also shows a modification wherein the valve base assembly 428, as shown in FIG. 65, is eliminated. It may be difficult or impractical to incorporate the valve base assembly 428 into a pre-existing system that is being repaired and/or modified. The conduit assembly $10^{5'}$ will function otherwise according to the description above, in the absence of the valve base assembly 428.

Figure 70:
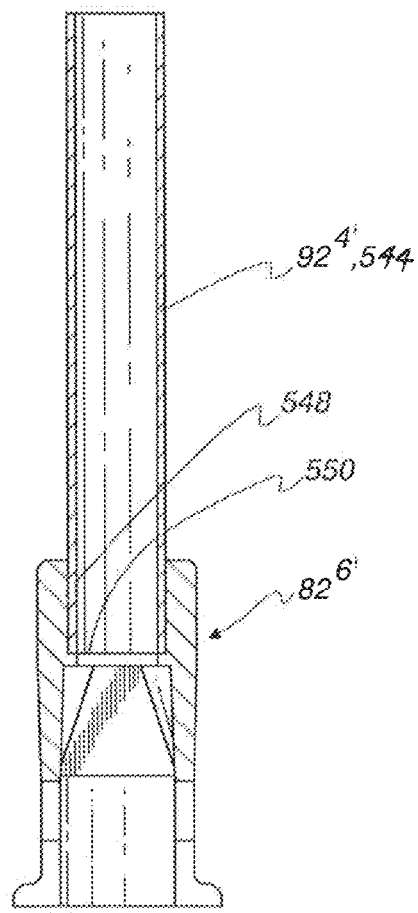
FIG. 70 is a cross-sectional view corresponding to that in FIG. 56 and showing a modified form of housing and structure connecting the housing and a lower conduit part on a conduit assembly.
Figure 71:
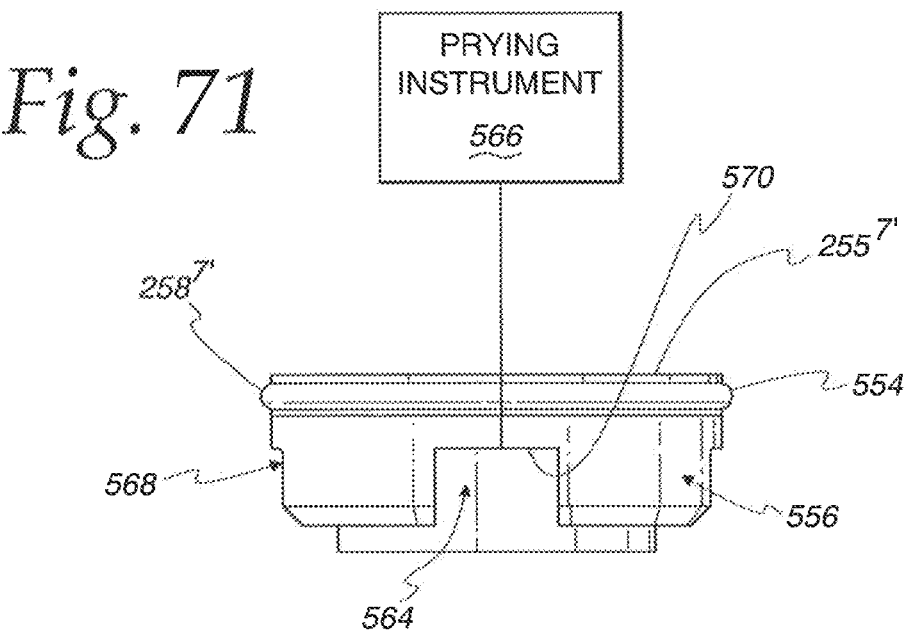
FIG. 71 is a perspective view of a modified form of conduit assembly cap, according to the invention.
Figure 72:
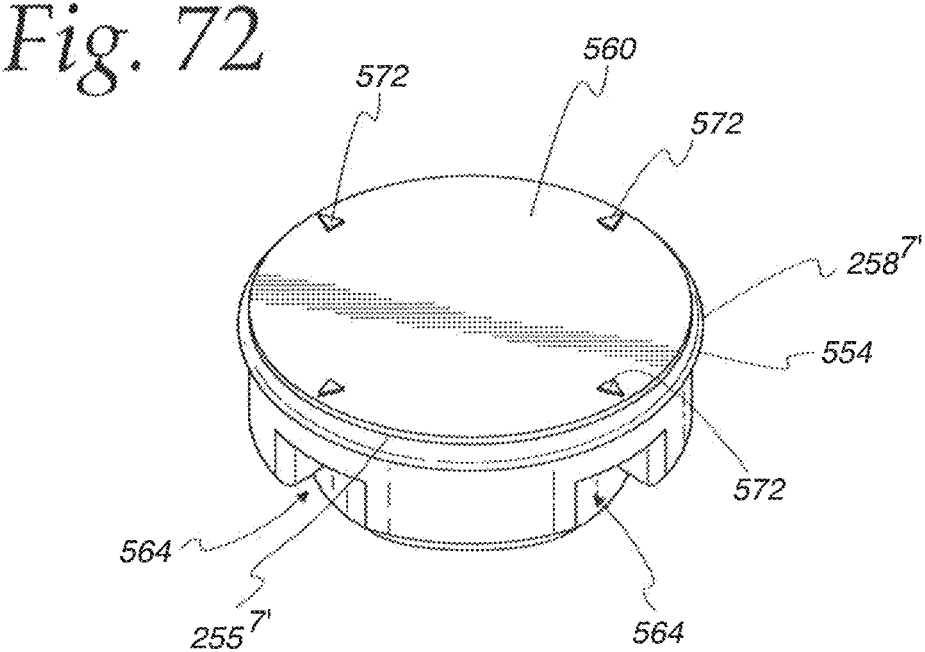
FIG. 72 is a side elevation view of the cap in FIG. 71.

In a further modified form of the invention, as shown in FIG. 70, a housing $82^{6'}$ defines a receptacle 548 for the conduit part $92^{4'}$ or the conduit part 544, depending upon the particular construction, without requiring the separate sleeve/bushing 460, as shown in FIG. 52.

The housing $82^{6'}$, which is preferably, but not required to be, made from a urethane material, is molded to define a stop surface/edge 550 to arrest downward movement of the conduit part $92^{4'}$, 544 that abuts thereto. The coupling 460 in the embodiment shown in FIG. 51 defines a corresponding stop surface/edge. Accordingly, downward movement of the conduit part $92^{4'}$, 544 is stopped before the conduit part $92^{4'}$, 544 might extend downwardly to interfere with normal operation of the valve $16^{4'}$. Potentially, in the absence of such a stop surface/edge, downward movement of the conduit part $92^{4'}$, 544 might even inflict damage upon the valve $16^{4'}$.

The invention also contemplates a variation of the cap as shown at 255' in FIGS. 38-42. As shown in FIGS. 71-75, the modified cap $255^{7'}$ is designed to cooperate with conduit pieces, such as the conduit pieces $90^{4'}$, 240". The conduit piece 552 is intended to generically encompass the conduit pieces $90^{4'}$, 240", and variations thereof.

The cap $255^{7'}$ is snap connected to the conduit piece 552. To effect this connection, the cap $255^{7'}$ has an annular bead $258^{7'}$ that cooperates with a complementarily-shaped receptacle $276^{7'}$ formed in the conduit piece 552.

The bead $258^{7'}$ has a curved outer surface 554 that may be approximated by an arc with a constant radius.

The cap $255^{7'}$ has a body region 556 below the bead $258^{7'}$ that has various contours that collectively produce an increasing diameter from bottom to top. This overall configuration tends to center the cap $255^{7'}$ as it is directed downwardly into the entry opening $274^{7'}$ on the conduit piece 552.

The bead outer surface 554 has a diameter greater than that of the radially inwardly facing surface 558 bounding the entry opening $274^{7'}$. As downward pressure is applied to the cap $255^{7'}$ during assembly thereof, the bead $258^{7'}$ is deformed radially inwardly. Once the bead $258^{7'}$ aligns axially with the receptacle $276^{7'}$, the bead $258^{7'}$ springs back towards its undeformed state and thereby positively maintains the cap $255^{7'}$ wedged in the closed position shown in FIGS. 73-75.

With the cap $255^{7'}$ in its closed position, a generally flat upper surface 560 thereon situates slightly beneath an upper annular edge 562 of the conduit piece 552. Thus, it is not apparent to a casual observer how the cap $255^{7'}$ is maintained in place and how it might be removed. This deters unauthorized separation of the cap $255^{7'}$.

To facilitate removal for an authorized person, at least one cutout, and, as depicted, a plurality of cutouts/notches 564, is provided in the body region 556 below the bead $258^{7'}$. The cutouts/notches 564 shown each defines a space to accommodate a prying instrument 566 that may be directed between the peripheral outer surface 568 on the cap $255^{7'}$ and the surface 558 on the conduit piece 552 to bear against a downwardly facing edge 570 bounding each cutout/notch 564. A force can be exerted on the prying instrument 566, using the annular edge 562 as a fulcrum to bear against the edge 570 to thereby force the cap $255^{7'}$ upwardly, through deformation thereof primarily at the bead region.

Indicia 572 may be provided on the surface 560 to identify the location of the cutouts/notches 564.

While the invention is operable with a single cutout/notch 564, as depicted, four such cutouts/notches 564 are provided at regularly spaced intervals around the perimeter of the cap $255^{7'}$.

Preferably, the cap $255^{7'}$ has a non-metal construction to allow the required deformation to effect assembly and disassembly thereof. Urethane is the preferred material. The cooperating conduit piece 552 may be made from any material. If both parts are made from a non-metal material, such as urethane, the above described advantages can be realized. Conduit piece 552 may be metal and will still allow assembly of the cap $255^{7'}$ as described above and will also afford the advantage of minimizing corrosion by reason of the non-metal construction of the cap $255^{7'}$.

The foregoing disclosure of specific embodiments is intended to be illustrative of the broad concepts comprehended by the invention.

The invention claimed is:
1. In combination:
an underground valve for a supply line and having an underground actuator through which a state of the valve can be changed to control flow within the supply line; and a conduit assembly embedded in ground material and defining an access passage with a central axis through which above ground access can be obtained to the valve actuator, the conduit assembly comprising a housing defining a cavity in which at least a portion of the valve resides, the housing configured to be movable vertically relative to the valve, the conduit assembly further comprising a valve base assembly configured to be placed in vertically overlapping relationship with the housing and interact with: a) the housing; and b) at least one of: i) the valve; and ii) the supply line to maintain a desired operative relationship between the housing and the at least one of: i) the valve; and ii) the supply line, wherein the housing defines a stop surface/edge and the conduit assembly comprises a first conduit part that is slidable guidingly relative to the housing along the central axis to abut the stop surface/edge without moving the first conduit part relative to the housing around the central axis, wherein the housing comprises a body and a sleeve that is a component separate from and attached to the housing body and the first conduit part is slidable guidingly against the sleeve along the central axis of the access passage, wherein the housing body defines a downwardly facing surface that confronts an upwardly facing surface on the sleeve to block upward axial movement of the sleeve relative to the housing body.

2. The combination according to claim 1 wherein the supply line has a central axis and the housing and valve base assembly cooperatively extend fully around the central axis of the supply line.

3. The combination according to claim 1 wherein the valve base assembly has a curved, upwardly opening seat that nominally conforms to the at least one of: i) the valve; and ii) the supply line.

4. The combination according to claim 1 wherein the housing is made from a urethane material.

5. The combination according to claim 1 wherein the housing extends downwardly to beyond the conduit and has an inverted U-shaped receptacle that straddles at least one of: i) the valve; and ii) the supply line.

6. The combination according to claim 1 wherein the supply line has a central axis and there are components cooperating between the valve base assembly and the at least one of: i) the valve; and ii) the supply line that are keyed to limit movement of the valve base assembly relative to the supply line along the supply line central axis.

7. The combination according to claim 1 wherein the conduit assembly further comprises a second conduit part that is telescopingly engaged with the first conduit part.

8. The combination according to claim 7 wherein the housing and first and second conduit parts are each made from a non-metal material.

9. The combination according to claim 8 wherein the conduit assembly defines an entry opening to the access passage and the conduit assembly further comprises a cap that can be selectively changed between: a) a first state wherein the cap blocks the entry opening; and b) a second state wherein above ground access can be gained to the valve actuator through the entry opening and access passage, wherein the cap is made from a non-metal material.

10. The combination according to claim 9 wherein the cap has a cutout/notch formed therein configured to receive a part of a tool that can be used to pry the cap out of its first state.

11. The combination according to claim 1 wherein the underground actuator is operated by turning around an axis, the combination further including an extension rod having a length and that extends upwardly from the underground actuator within the access passage and an extension rod support that is attached to the extension rod is configured to move lengthwise relative to the extension rod and act against a surface bounding the access passage.

12. The combination according to claim 1 wherein the housing resides at only a bottom region of the conduit assembly.

13. The combination according to claim 1 wherein the housing and valve base assembly are configured so that the housing and valve base assembly can be operatively engaged and maintained together by advancing the housing downwardly relative to the valve and valve base assembly.

14. In combination: an underground valve for a supply line and having an underground actuator through which a state of the valve can be changed to control flow within the supply line; and a conduit assembly embedded in ground material and defining an access passage with a central axis through which above ground access can be obtained to the valve actuator, the conduit assembly comprising a housing defining a cavity in which at least a portion of the valve resides, the conduit assembly further comprising a valve base assembly configured to interact with: a) the housing; and b) at least one of: i) the valve; and ii) the supply line to maintain a desired relationship between the housing and the at least one of: i) the valve; and ii) the supply line, wherein the housing comprises a sleeve and the conduit assembly comprises a first conduit part that is slidable guidingly against the sleeve along the central axis of the access passage, wherein the housing has a body defined by a base material and the sleeve is a component separate from the housing body and embedded in the housing body, wherein the housing body defines a downwardly facing surface that confronts an upwardly facing surface on the sleeve to block upward axial movement of the sleeve relative to the housing body.

15. In combination: an underground valve for a supply line and having a top and bottom and an underground actuator through which a state of the valve can be changed to control flow within the supply line; and a conduit assembly embedded in ground material and defining an access passage with a central axis through which above ground access can be obtained to the valve actuator, the conduit assembly comprising a housing defining a cavity in which at least a portion of the valve resides, the conduit assembly configured so that the housing is movable vertically relative to the valve, wherein the housing has an inverted U-shaped receptacle that straddles at least one of: i) the valve; and ii) the supply line, wherein the housing is made from a urethane material and has a bottom surface at the bottom of the underground valve for bearing against the ground material to thereby vertically support the conduit assembly in an operative position, the U-shaped receptacle configured to allow the operatively positioned conduit assembly to be raised to be separated from the underground valve, wherein the housing comprises a body and a sleeve that is a component separate from and attached to the housing body and the conduit assembly comprises a first conduit part that is slidable guidingly against the sleeve along the central axis of the access passage, wherein the housing body defines a downwardly facing surface that confronts an upwardly facing surface on the sleeve to block upward axial movement of the sleeve relative to the housing body.

16. The combination according to claim 15 wherein the sleeve defines a stop surface/edge and the conduit assembly is slidable guidingly relative to the sleeve along the central axis to abut the stop surface/edge, wherein the stop surface/edge is made from a material different than urethane.

17. The combination according to claim 15 wherein the underground actuator is operated by turning around an axis, the combination further including an extension rod having a length that extends upwardly from the underground actuator within the access passage and an extension rod support that is attached to the extension rod and configured to move lengthwise relative to the extension rod and act against a surface bounding the access passage.

18. In combination: an underground valve for a supply line and having an underground actuator through which a state of the valve can be changed to control flow within the supply line; and a conduit assembly embedded in ground material and defining an access passage with a central axis through which above ground access can be obtained to the valve actuator, the conduit assembly comprising a housing defining a cavity in which at least a portion of the valve resides, wherein the housing is configured to be movable vertically relative to the valve, wherein the housing has an inverted U-shaped receptacle that straddles at least one of: i) the valve; and ii) the supply line, wherein the housing is made from a non-metal material, wherein the housing comprises a body and a sleeve that is a component separate from the housing body and connected to the housing body and the conduit assembly comprises a first conduit part that is slidable guidingly against the sleeve along the central axis of the access passage, wherein the housing body is defined by a base material in which the sleeve is embedded, wherein the sleeve defines an upwardly facing surface that confronts a downwardly facing surface on the housing body.

19. The combination according to claim 18 wherein the conduit assembly further comprises a second conduit part that is telescopingly engaged with the first conduit part and the housing and first and second conduit parts are each made from a non-metal material.

20. The combination according to claim 19 wherein the conduit assembly defines an entry opening to the access passage and the conduit assembly further comprises a cap that can be selectively changed between: a) a first state wherein the cap blocks the entry opening; and b) a second state wherein above ground access can be gained to the valve actuator through the entry opening and access passage, wherein the cap is made from a non-metal material.

21. A method of installing a conduit assembly to facilitate controlled access to an actuator on an underground valve, the method comprising the steps of:
  providing the combination of claim 19;
  repositioning the housing so that the U-shaped receptacle straddles the at least one of: i) the valve; and ii) the supply line;
  sliding one end of the first conduit part against the sleeve along the central axis of the access passage;
  cutting the first conduit part at a second location so that the first conduit part has a selected length between the one end and the second location;
  telescopingly engaging the second conduit part with the first conduit part so that the first and second conduit parts have a desired combined length; and
  compacting material around the conduit assembly.

22. The method of installing a conduit assembly according to claim 21 wherein the supply line has a central axis and further comprising the step of interconnecting the housing and the at least one of: i) the valve; and ii) the supply line so that the housing and the at least one of: i) the valve; and ii) the supply line are keyed to limit movement of the housing relative to the supply line along the supply line central axis.

23. The combination according to claim 1 wherein the valve base assembly projects into the cavity.

* * * * *